(12) United States Patent
Kong et al.

(10) Patent No.: US 11,354,814 B2
(45) Date of Patent: Jun. 7, 2022

(54) VISION-BASED FASTENER LOOSENING DETECTION

(71) Applicant: University of Kansas, Lawrence, KS (US)

(72) Inventors: Xiangxiong Kong, Lawrence, KS (US); Jian Li, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 73 days.

(21) Appl. No.: 16/982,226

(22) PCT Filed: Mar. 22, 2019

(86) PCT No.: PCT/US2019/023581
§ 371 (c)(1),
(2) Date: Sep. 18, 2020

(87) PCT Pub. No.: WO2019/183475
PCT Pub. Date: Sep. 26, 2019

(65) Prior Publication Data
US 2021/0027475 A1    Jan. 28, 2021

Related U.S. Application Data

(60) Provisional application No. 62/647,136, filed on Mar. 23, 2018.

(51) Int. Cl.
*G06T 7/33*    (2017.01)
*G06T 7/11*    (2017.01)
(Continued)

(52) U.S. Cl.
CPC .......... *G06T 7/337* (2017.01); *G01N 21/8851* (2013.01); *G06T 7/001* (2013.01);
(Continued)

(58) Field of Classification Search
CPC ....... G06T 7/337; G06T 7/0008; G06T 7/001; G06T 7/11; G01N 21/8851; G01N 2021/8893; G06V 20/10; G06V 2201/06
(Continued)

(56) References Cited

U.S. PATENT DOCUMENTS

| | | | |
|---|---|---|---|
| 7,697,727 | B2 | 4/2010 | Xu et al. |
| 8,803,977 | B2 | 4/2014 | Uchima et al. |

(Continued)

FOREIGN PATENT DOCUMENTS

| | | | |
|---|---|---|---|
| CN | 107145905 A | | 9/2017 |
| CN | 112381791 A | * | 2/2021 |

(Continued)

OTHER PUBLICATIONS

International Search Report and Written Opinion of PCT/US2018/063264 dated Apr. 3, 2019.
(Continued)

*Primary Examiner* — Amandeep Saini
(74) *Attorney, Agent, or Firm* — Thomas Horstemeyer, LLP

(57) ABSTRACT

A computer vision-based fastener loosening detection approach is described. A first image is captured at a first time and a second image is captured at a second time. A feature-based image registration is performed to create a third image. An intensity-based image registration is performed to create a fourth image. Registration errors are determined based on a comparison of the first and fourth images. A feature enhancement process is performed on the registration errors to determine whether the fastener has loosened between the first time and the second time.

20 Claims, 19 Drawing Sheets

(51) Int. Cl.
  *G01N 21/88* (2006.01)
  *G06T 7/00* (2017.01)
(52) U.S. Cl.
  CPC .............. *G06T 7/0008* (2013.01); *G06T 7/11* (2017.01); *G01N 2021/8893* (2013.01)
(58) Field of Classification Search
  USPC ........................................................ 382/141
  See application file for complete search history.

(56) References Cited

U.S. PATENT DOCUMENTS

| | | | |
|---|---|---|---|
| 9,014,415 | B2 | 4/2015 | Chen et al. |
| 9,976,968 | B2 | 5/2018 | Ito et al. |
| 2008/0050043 | A1 | 2/2008 | Valadez et al. |
| 2010/0310128 | A1 | 12/2010 | Iliopoulos et al. |
| 2015/0125091 | A1 | 5/2015 | Gallo et al. |
| 2015/0215584 | A1 | 6/2015 | Tapia et al. |
| 2016/0292518 | A1 | 10/2016 | Banitt et al. |
| 2018/0189749 | A1 | 7/2018 | Takamori et al. |
| 2018/0195973 | A1 | 7/2018 | Yonekawa et al. |

FOREIGN PATENT DOCUMENTS

| | | |
|---|---|---|
| GB | 2057124 A | 3/1981 |
| GB | 2542118 A | 9/2015 |
| JP | 4886999 B2 | 2/2012 |
| JP | 5221984 B2 | 6/2013 |
| KR | 10 1458487 B1 | 11/2014 |
| KR | 101458487 B1 | 11/2014 |
| KR | 20160136905 A | 11/2016 |
| WO | 0225588 A3 | 3/2002 |
| WO | 2016022154 A1 | 2/2016 |

OTHER PUBLICATIONS

International Search Report and Written Opinion of PCT/US2019/023581 dated Jun. 7, 2019.
International Search Report and Written Opinion of PCT/US2019/047272 dated Nov. 15, 2019.
International Search Report for PCT/US19/23581, dated Jun. 7, 2019.
R.S. Adhikari, et al. (2014) "Image-based Retrieval of Concrete Crack Properties for Bridge Inspection," ("the Adhikari article"), (pp. 180-194).
Abdel-Qader, I., Abudayyeh, O., & Kelly, M. E. (2003). Analysis of edge-detection techniques for crack identification in bridges. Journal of Computing in Civil Engineering, 17(4), (pp. 255-263.).
ASTM International. (2015). "Standard test method for measurement of fracture toughness." ASTM International, (pp. 1-65).
Bay, H., Tuytelaars, T., & Van Gool, L. (May 2006). Surf: Speeded up robust features. In European conference on computer vision (pp. 404-417). Springer Berlin Heidelberg.
Canny, J. (1986). A computational approach to edge detection. IEEE Transactions on pattern analysis and machine intelligence, (6), (pp. 679-698.).
Cha, Y. J., Choi, W., & Buyukozturk, O. (2017). Deep learning-based crack damage detection using convolutional neural network. Computer-Aided Civil and Infrastructure Engineering, 32(3), 2013-2014 (pp. 361-378).
Chen, F. C., Jahanshahi, M. R., Wu, R. T., & Joffe, C. (2017). A texture-Based Video Processing Methodology Using Bayesian Data Fusion for Autonomous Crack Detection on Metallic Surfaces. Computer-Aided Civil and Infrastructure Engineering, 32(4), (pp. 271-287.).
Chen, J. G., Davis, A., Wadhwa, N., Durand, F., Freeman, W. T., & Büyüköztürk, O. (2016). Video Camera-Based Vibration Measurement for Civil Infrastructure Applications. Journal of Infrastructure Systems, 12 (3), (pp. B4016013:1-B4016013:1-B4016013:11.).

Chen, J. G., Wadhwa, N., Cha, Y. J., Durand, F., Freeman, W. T., & Buyukozturk, O. (2015). Modal identification of simple structures with high-speed video using motion magnification. Journal of Sound and Vibration, 345, (pp. 58-71.).
Coifman, B., Beymer, D., McLauchlan, P., & Malik, J. (1998). A real-time computer vision system for vehicle tracking and traffic surveillance. Transportation Research Part C: Emerging Technologies, 6(4), (pp. 271-288.).
Dias-da-Costa, D., Valença, J., Júlio, E., & Araújo, H. (2016). Crack propagation monitoring using an image deformation approach. Structural Control and Health Monitoring. e1973. doi: 10.1002/stc.1973. (pp. 1-14).
El-Hakim, S. F., Beraldin, J. A., Picard, M., & Godin, G. (2004). Detailed 3D reconstruction of large-scale heritage sites with integrated techniques. IEEE Computer Graphics and Applications, 24(3), (pp. 21-29.).
Feng, D., & Feng, M. Q. (2017). Experimental validation of cost-effective vision-based structural health monitoring. Mechanical Systems and Signal Processing, 88, (pp. 199-211.).
Feng, M. Q., Fukuda, Y., Feng, D., & Mizuta, M. (2015). Nontarget vision sensor for remote measurement of bridge dynamic response. Journal of Bridge Engineering, 20(12), (pp. 04015023:1-04015023:12).
Glišić, B., Yao, Y., Tung, S. T. E., Wagner, S., Sturm, J. C., & Verma, N. (2016). Strain Sensing Sheets for Structural Health Monitoring Based on Large-Area Electronics and Integrated Circuits. Proceedings of the IEEE, 104(8), (pp. 1513-1528.).
Haghani, R., Al-Emrani, M., & Heshmati, M. (2012). Fatigue-prone details in steel bridges. Buildings, 2(4), (pp. 456-476.).
Harris, C., & Stephens, M. (Aug. 1988). A combined corner and edge detector. In Alvey vision conference 15 (50), (pp. 147-151).
Hassel, H. L., Bennett, C. R., Matamoros, A. B., & Rolfe, S. T. (2013). Parametric analysis of cross-frame layout on distortion-induced fatigue in skewed steel bridges. Journal of Bridge Engineering, 18(7), (pp. 601-611.).
Hutt, T., & Cawley, P. (2009). Feasibility of digital image correlation for detection of cracks at fastener holes. NDT & e International, 42(2), (pp. 141-149.).
Ihn JB, and Chang FK. (2004). Detection and monitoring of hidden fatigue crack growth using a built-in piezoelectric sensor/actuator network: I. Diagnostics. Smart materials and structures. 13: (pp. 608-620).
Iyer, S., & Sinha, S. K. (2006). Segmentation of pipe images for crack detection in buried sewers. Computer-Aided Civil and Infrastructure Engineering, 21(6), (pp. 395-410.).
Jahanshahi, M. R., & Masri, S. F. (2012). Adaptive vision-based crack detection using 3D scene reconstruction for condition assessment of structures. Automation in Construction, 22, (pp. 567-576.).
Kalal, Z., Mikolajczyk, K., & Matas, J. (Aug. 2010). Forward-backward error: Automatic detection of tracking failures. In Pattern recognition (ICPR), 2010 20th international conference on (pp. 2756-2759). IEEE.
Kong, X., Li, J., Bennett, C., Collins, W., & Laflamme, S. (2016). Numerical simulation and experimental validation of a large-area capacitive strain sensor for fatigue crack monitoring. Measurement Science and Technology, 27(12), 124009.
Kong, X., Li, J., Collins, W., Bennett, C., Laflamme, S., & Jo, H. (2017). A large-area strain sensing technology for monitoring fatigue cracks in steel bridges. Smart Materials and Structures, 26(8).
Lowe, D. G. (2004). Distinctive image features from scale-invariant keypoints. International journal of computer vision, 60(2), (pp. 91-110.).
Lucas, Bruce D. and Takeo Kanade (1981). An Iterative Image Registration Technique with an Application to Stereo Vision, Proceedings of the 7th International Joint Conference on Artificial Intelligence, Apr. 1981, (pp. 674-679).
Man, S. H., & Chang, C. C. (2016). Design and performance tests of a LED-based twodimensional wireless crack propagation sensor. Structural Control and Health Monitoring, 23(4), (pp. 668-683.).
Mokhtari, S., Wu, L., & Yun, H. B. (2017). Statistical Selection and Interpretation of Imagery Features for Computer Vision-Based Pavement Crack-Detection Systems. Journal of Performance of Constructed Facilities, 31(5), 04017054.

(56) References Cited

OTHER PUBLICATIONS

Nishikawa, T., Yoshida, J., Sugiyama, T., & Fujino, Y. (2012). Concrete crack detection by multiple sequential image filtering. Computer-Aided Civil and Infrastructure Engineering, 27(1), (pp. 29-47.).

Park, J. W., Lee, J. J., Jung, H. J., & Myung, H. (2010). Vision-based displacement measurement method for high-rise building structures using partitioning approach. NDT & E International, 43(7), (pp. 642-647.).

Polák, I., & Zezulka, P. (2005). Short crack growth and fatigue life in austenitic-ferritic duplex stainless steel. Fatigue & Fracture of Engineering Materials & Structures, 28(10), (pp. 923-935.).

Roberts, T., & Talebzadeh, M. (2003). Acoustic emission monitoring of fatigue crack propagation. Journal of Constructional Steel Research, 59(6), (pp. 695-712.).

Rosten, E., & Drummond, T. (Oct. 2005). Fusing points and lines for high performance tracking. In Tenth IEEE International Conference on Computer Vision (ICCV'05) vol. 1 (vol. 2, pp. 1508-1515). IEEE.

Rupil, J., Roux, S., Hild, F., & Vincent, L. (2011). Fatigue microcrack detection with digital image correlation. The Journal of Strain Analysis for Engineering Design, 46(6) (pp. 1-57).

Saxena, A., & Hudak, S. J. (1978). Review and extension of compliance information for common crack growth specimens. International Journal of Fracture, 14(5), (pp. 453-468.).

Shi, J. (Jun. 1994). Good features to track. In Computer Vision and Pattern Recognition, 1994. Proceedings CVPR'94., 1994 IEEE Computer Society Conference on (pp. 593-600). IEEE.

Sinha, S. N., Frahm, J. M., Pollefeys, M., & Genc, Y. (May 2006). GPU-based video feature tracking and matching. In EDGE, Workshop on Edge Computing Using New Commodity Architectures (vol. 278, p. 4321:1-15).

Sobel, I., & Feldman, G. (1973). A 3x3 isotropic gradient operator for image processing. a talk at the Stanford Artificial Project in, 271-272.

Sutton, M. A., Zhao, W., McNeill, S. R., Helm, J. D., Piascik, R. S., & Riddell, W. T. (1999). Local crack closure measurements: Development of a measurement system using computer vision and a far-field microscope. In Advances in fatigue crack closure measurement and analysis: second volume. ASTM International, (pp. 145-156).

Ta, D. N., Chen, W. C., Gelfand, N., & Pulli, K. (Jun. 2009). Surftrac: Efficient tracking and continuous object recognition using local feature descriptors. In Computer Vision and Pattern Recognition, 2009. CVPR 2009. IEEE Conference on (pp. 2937-2944). IEEE.

Tomasi, Carlo and Takeo Kanade (1991). Detection and Tracking of Point Features, Computer Science Department, Carnegie Mellon University, Apr. 1991.

Vanlanduit, S., Vanherzeele, J., Longo, R., & Guillaume, P. (2009). A digital image correlation method for fatigue test experiments. Optics and Lasers in Engineering, 47(3), (pp. 371-378.).

Wahbeh, A. M., Caffrey, J. P., & Masri, S. F. (2003). A vision-based approach for the direct measurement of displacements in vibrating systems. Smart materials and structures, 12(5), (pp. 785-794).

Xu, Y., Li, S., Zhang, D., Jin, Y., Zhang, F., Li, N., & Li, H. (2017). Identification framework for cracks on a steel structure surface by a restricted Boltzmann machines algorithm based on consumer-grade camera images. Structural Control and Health Monitoring, (pp. 1-20).

Yamaguchi, T., Nakamura, S., Saegusa, R., & Hashimoto, S. (2008). Image-Based Crack Detection for Real Concrete Surfaces. IEEJ Transactions on Electrical and Electronic Engineering, 3(1), (pp. 128-135 ).

Yang, Y., Dorn, C., Mancini, T., Talken, Z., Kenyon, G., Farrar, C., & Mascareñas, D. (2017). Blind identification of full-field vibration modes from video measurements with phase-based video motion magnification. Mechanical Systems and Signal Processing, 85, (pp. 567-590.).

Yeum, C. M., & Dyke, S. J. (2015). Vision-Based Automated Crack Detection for Bridge Inspection. Computer-Aided Civil and Infrastructure Engineering, 30(10), (pp. 759-770.).

Yoon, H., Elanwar, H., Choi, H., Golparvar-Fard, M., & Spencer, B. F. (2016). Target-free approach for vision-based structural system identification using consumer-grade cameras. Structural Control and Health Monitoring. (pp. 1405-1416).

Zhang, A., Wang, K.C., Li, B., Yang, E., Dai, X., Peng, Y., Fei, Y., Liu, Y., Li, J.Q. and Chen, C. (2017), Automated Pixel-Level Pavement Crack Detection on 3D Asphalt Surfaces Using a Deep-Learning Network. Computer-Aided Civil and Inftastructure Engineering. doi:10.1111/mice.12297 (pp. 805-819).

Zhao Z, & Haidar A. (1996). Bridge fatigue damage evaluation and updating using nondestructive inspections. Engineering fracture mechanics. 53(5), (pp. 775-788).

Zoghlami, I., Faugeras, O., & Deriche, R. (Jun. 1997). Using geometric corners to build a 2D mosaic from a set of images. In Computer Vision and Pattern Recognition, 1997. Proceedings., 1997 IEEE Computer Society Conference on (pp. 420-425). IEEE.

Oberhelman, D. (2015). Road to Growth: The Case for Investing in America's Transportation Infrastructure. Business Roundtable. Retrieved from: http://businessroundtable.org/sites/default/files/2015.09.16%20Infrastructure%20Report%20-%20Final.pdf.

Mahmoud, H. (2017). Upgrading our infrastructure: Targeting repairs for locks, dams and bridges. The Conversation, Mar. 13, 2017.

Lichtenstein, A.G. (1993). The Silver Bridge collapse recounted. Journal of Performance of Constructed Facilities, 7(4), (pp. 249-261).

Fang, Z., Li, A., Li, W., and Shen, S. (2017). Wind-induced fatigue analysis of high-rise steel structures using equivalent structural stress method. Applied Sciences, 7, 71. (pp. 1-18).

Bothma, J.G. (2012). Transmission line tower collapse investigation: a case study. IEEE Power and Energy Society Conference and Exposition in Africa: Intelligent Grid Integration of Renewable Energy Resources (PowerAfrica), Johannesburg, South Africa, Jul. 9-13.

Federal Highway Administration (FHWA). (2004). National bridge inspection standards, Federal Register, 69 (239) (pp. 74420-74439).

Zhao Z, and Haldar A. (1996). Bridge fatigue damage evaluation and updating using nondestructive inspections. Engineering fracture mechanics. 53(5), (pp. 775-788).

Graybeal, B. A., Phares, B. M., Rolander, D. D., Moore, M., & Washer, G. (2002). Visual inspection of highway bridges. Journal of nondestructive evaluation, 21(3), (pp. 67-83.).

Staszewski, W. J., Lee, B. C., & Traynor, R. (2007). Fatigue crack detection in metallic structures with Lamb waves and 3D laser vibrometry. Measurement Science and Technology, 18(3), (pp. 727-739).

Leong, W. H., Staszewski, W. J., Lee, B. C., & Scarpa, F. (2005). Structural health monitoring using scanning laser vibrometry: III. Lamb waves for fatigue crack detection. Smart Materials and Structures, 14(6), (pp. 1387-1395).

Ihn, J. B., & Chang, F. K. (2004). Detection and monitoring of hidden fatigue crack growth using a built-in piezoelectric sensor/actuator network: I. Diagnostics. Smart materials and structures, 13(3), (pp. 609-620).

Andrade, F. A., Esat, I., & Badi, M. N. M. (2001). A new approach to time-domain vibration condition monitoring: gear tooth fatigue crack detection and identification by the Kolmogorov-Smirnov test. Journal of Sound and vibration, 240 (5), (pp. 909-919.).

Blunt, D. M., & Keller, J. A. (2006). Detection of a fatigue crack in a UH-60A planet gear carrier using vibration analysis. Mechanical Systems and Signal Processing, 20(8), (pp. 2095-2111.).

Yao, Y., & Glisic, B. (2015). Detection of steel fatigue cracks with strain sensing sheets based on large area electronics. Sensors, 15(4), (pp. 8088-8108.).

Wu, L., Mokhtari, S., Nazef, A., Nam, B., & Yun, H. B. (2016) "Improvement of crack-detection accuracy using a novel crack defragmentation technique in image-based road assessment". Journal of Computing in Civil Engineering, 30(1), 04014118.

Iyer, S., & Sinha, S. K. (2005). A robust approach for automatic detection and segmentation of cracks in underground pipeline images. Image and Vision Computing, 23(10), (pp. 921-933.).

(56) References Cited

OTHER PUBLICATIONS

Cha, Y. J., Choi, W., & Büyüköztürk, O. (2017). Deep Learning-Based Crack Damage Detection Using Convolutional Neural Networks. Computer-Aided Civil and Infrastructure Engineering, 32(5), (pp. 361-378.).

Zhang, L., Yang, F., Zhang, Y. D., & Zhu, Y. J. (Sep. 2016). Road crack detection using deep convolutional neural network. In Image Processing (ICIP), 2016 IEEE International Conference on (pp. 3708-3712). IEEE.

Zhang, A., Wang, K. C., Li, B., Yang, E., Dai, X., Peng, Y., & Chen, C. (2017). Automated Pixel-Level Pavement Crack Detection on 3D Asphalt Surfaces Using a Deep—Learning Network. Computer-Aided Civil and Infrastructure Engineering, 32(10), (pp. 805-819.).

Xu, Y., Bao, Y., Chen, J., Zuo, W., & Li, H. (2018). Surface fatigue crack identification in steel box girder of bridges by a deep fusion convolutional neural network based on consumer-grade camera images. Structural Health Monitoring, vol. 18(3), (pp. 653-674).

Chen, F. C., & Jahanshahi, M. R. (2017). NB-CNN: Deep Learning-based Crack Detection Using Convolutional Neural Network and Naive Bayes Data Fusion. IEEE Transactions on Industrial Electronics. vol. 65(5), (pp. 4392-4400).

Patel, T. H., & Darpe, A. K. (2008). Influence of crack breathing model on nonlinear dynamics of a cracked rotor. Journal of Sound and Vibration, 311(3-5), (pp. 953-972.).

Chondros, T. G., Dimarogonas, A. D., & Yao, J. (2001). Vibration of a beam with a breathing crack. Journal of Sound and vibration, 239(1), (pp. 57-67.).

Poák, J., & Zezulka, P. (2005). Short crack growth and fatigue life in austenitic-ferritic duplex stainless steel. Fatigue & Fracture of Engineering Materials & Structures, 28(10), (pp. 923-935.).

Kong, X., & Li, J. (2018). Vision-Based Fatigue Crack Detection of Steel Structures Using Video Feature Tracking. Computer-Aided Civil and Infrastructure Engineering. In press (33) (pp. 783-799).

Rueckert, D., Sonoda, L. I., Hayes, C., Hill, D. L., Leach, M. O., & Hawkes, D. J. (1999). Nonrigid registration using free-form deformations: application to breast MR images. IEEE transactions on medical imaging, 18(8), (pp. 712-721.).

Bentoutou, Y., Taleb, N., Kpalma, K., & Ronsin, J. (2005). An automatic image registration for applications in remote sensing IEEE transactions on geoscience and remote sensing, 43(9), (pp. 2127-2137).

Dwith Chenna, Y. N., Ghassemi, P., Pfefer, T. J., Casamento, J., & Wang, Q. (2018). Free-Form Deformation Approach for Registration of Visible and Infrared Facial Images in Fever Screening. Sensors, 18(1), 125.

Kong, X., & Li, J. (2018). Image registration-based bolt loosening detection of steel joints. Sensors, 18(4), 1000.

Lucas, Bruce D. and Takeo Kanade. An Iterative Image Registration Technique with an Application to Stereo Vision, Proceedings of the 7th International Joint Conference on Artificial Intelligence, Apr. 1981, (pp. 674 679.).

Torr, P. H., & Zisserman, A. Mlesac: A new robust estimator with application to estimating image geometry. Computer Vision and Image Understanding, 1996, 78(1), (pp. 138-156.).

Leutenegger, S., Chli, M., & Siegwart, R. Y. BRISK: Binary robust invariant scalable keypoints. In Computer Vision (ICCV), 2011 IEEE International Conference on (pp. 2548-2555). IEEE. Nov. 2011.

Tareen, S. A. K., & Saleem, Z. (Mar. 2018). A comparative analysis of Sift, Surf, Kaze, Akaze, Orb, and BRISK. In Computing, Mathematics and Engineering Technologies (iCoMET), 2018 International Conference on (pp. 1-10). IEEE.

Thirion, J. P. (1998). Image matching as a diffusion process: an analogy with Maxwell's demons. Medical Image Analysis, 2(3), (pp. 243-260.).

Vercauteren, T., Pennec, X., Perchant, A., & Ayache, N. (2009). Diffeomorphic demons: Efficient non-parametric image registration. NeuroImage, 45(1), (pp. S61-S72.).

Zitova, B., & Flusser, J. Image registration methods: a survey. Image and vision computing, 2003, 21(11), (pp. 977-1000).

Paris, S., Hasinoff, S. W., & Kautz, J. (2011). Local Laplacian filters: Edge-aware image processing with a Laplacian pyramid. ACM Trans. Graph., 30(4), (pp. 68-1-68:11).

Aubry, M., Paris, S., Hasinoff, S. W., Kautz, J., & Durand, F. (2014). Fast local laplacian filters: Theory and applications. ACM Transactions on Graphics (TOG), 33(5), (pp. 167:1-167:14).

Jajich, D., & Schultz, A. E. (2003). Measurement and analysis of distortion-induced fatigue in multigirder steel bridges. Journal of Bridge Engineering, 8(2), (pp. 84-91.).

Canny, J. (1986). A computational approach to edge detection. In Readings in Computer Vision vol. Pami-8 No. 6 (pp. 679-698).

Cha, Y. J., Choi, W., Suh, G., Mahmoudkhani, S., & Büyüköztürk, O. (2018). Autonomous structural visual inspection using region-based deep learning for detecting multiple damage types. Computer-Aided Civil and Infrastructure Engineering, 33(9), (pp. 731-747). https://doi.org/10.1111/mice.12334.

Cha, Y. J., You, K., & Choi, W. (2016). Vision-based detection of loosened bolts using the Hough transform and support vector machines. Automation in Construction, 71, (pp. 181-188.) https://doi.org/10.1016/j.autcon.2016.06.008.

ASTM International. (2015). Standard test method for measurement of fracture toughness. ASTM International, https://doi.org/10.1520/E1820-15A.

Jiang, Y.; Zhang, M.; & Lee, C. H. A study of early stage self-loosening of bolted joints. Journal of Mechanical Design, 2003, 125(3), (pp. 518-526.).

Yang, J., & Chang, F. K. Detection of bolt loosening in C-C composite thermal protection panels: I. Diagnostic principle. Smart Materials and Structures, 2006, 15(2), (pp. 581-590).

Zhao X, Gao H, Zhang G, et al. Active health monitoring of an aircraft wing with embedded piezoelectric sensor/actuator network: I. Defect detection, localization and growth monitoring. Smart Mater Struct 2007; 16(4): (pp. 1208-1217).

Nikravesh, S. M. Y., & Goudarzi, M. A Review Paper on Looseness Detection Methods in Bolted Structures. Latin American Journal of Solids and Structures, 2017, 13. (pp. 2153-2176).

Wu, J., Cui, X., & Xu, Y. A Novel RFID-Based Sensing Method for Low-Cost Bolt Loosening Monitoring. Sensors, 2016, 16(2), 168.

Khuc, T., & Catbas, F. N. Structural Identification Using Computer Vision-Based Bridge Health Monitoring. Journal of Structural Engineering, 2017, 144(2), (pp. 04017202:1-04017202:13).

Feng, D., & Feng, M. Q. Vision-based multipoint displacement measurement for structural health monitoring. Structural Control and Health Monitoring, 2016, 23(5), (pp. 876-890.).

Abdelbarr, M., Chen, Y. L., Jahanshahi, M. R., Masri, S. F., Shen, W. M., & Qidwai, U. A. 3D dynamic displacement field measurement for structural health monitoring using inexpensive RGB-D based sensor. Smart Materials and Structures, 2017, 26(12), (pp. 125016:1-125016.:23).

Kohut, P., Holak, K., & Martowicz, A. An uncertainty propagation in developed vision based measurement system aided by numerical and experimental tests. Journal of Theoretical and Applied Mechanics, 2012, 50(4), (pp. 1049-1061.).

Yeum, C. M., Dyke, S. J., & Ramirez, J. Visual data classification in post-event building reconnaissance. Engineering Structures, 2018, 155, (pp. 16-24.).

Cha, Y. J., Choi, W., Suh, G., Mahmoudkhani, S., & Büyüköztürk, O. Autonomous Structural Visual Inspection Using Region-Based Deep Learning for Detecting Multiple Damage Types. Computer-Aided Civil and Inftastructure Engineering. 2017 (33) (pp. 731-747).

Kong, X., and Li, J. Vision-based fatigue crack detection of steel structures using video feature tracking. Computer-Aided Civil and Infrastructure Engineering, 2018, In Press. (33) (pp. 783-799).

Yoon, H., Hoskere, V., Park, J. W., & Spencer, B. F. Cross-correlation-based structural system identification using unmanned aerial vehicles. Sensors, 2017, 17(9), 2075.

Kim, H., Lee, J., Ahn, E., Cho, S., Shin, M., & Sim, S. H. Concrete Crack Identification Using a UAV Incorporating Hybrid Image Processing. Sensors, 2017, 17(9), 2052.

(56) References Cited

OTHER PUBLICATIONS

Ong, W. H., Chiu, W. K., Kuen, T., & Kodikara, J. Determination of the State of Strain of Large Floating Covers Using Unmanned Aerial Vehicle (UAV) Aided Photogrammetry. Sensors, 2017, 17(8), 1731.
Escobar-Wolf, R., Oommen, T., Brooks, C. N., Dobson, R. J., & Ahlborn, T. M. Unmanned Aerial Vehicle (UAV)-Based Assessment of Concrete Bridge Deck Delamination Using Thermal and Visible Camera Sensors: A Preliminary Analysis. Research in Nondestructive Evaluation, 2017, (pp. 1-16.).
Xu, Y., & Brownjohn, J. M. Review of machine-vision based methodologies for displacement measurement in civil structures Journal of Civil Structural Health Monitoring, 2017, (pp. 91-110).
Park, J., Kim, T., & Kim, J. Image-based bolt-loosening detection technique of bolt joint in steel bridges. In 6th International conference on advances in experimental structural engineering, University of Illinois, Urbana-Champaign. 2015.
Park, J. H., Huynh, T. C., Choi, S. H., & Kim, J. T. Vision-based technique for bolt-loosening detection in wind turbine tower. Wind and Structures, 2015, 21(6), (pp. 709-726.).
Ramana, L., Choi, W., and Cha, Y. J. Fully automated vision-based loosened bolt detection using the Viola-Jones algorithm, Structural Health Monitoring, 2018, In press. vol. 18(2) (pp. 422-434).
Crum, W. R., Hartkens, T., & Hill, D. L. G. Non-rigid image registration: theory and practice. The British journal of radiology, 77(suppl_2), 2004, (pp. S140-S153.).
Klein, S., Staring, M., Murphy, K., Viergever, M. A., & Pluim, J. P. Elastix: a toolbox for intensity-based medical image registration. IEEE transactions on medical imaging, 2010, 29(1), (pp. 196-205).
Achanta, R., Shaji, A., Smith, K., Lucchi, A., Fua, P., & Süsstrunk, S. SLIC superpixels compared to state-of-the-art superpixel methods. IEEE transactions on pattern analysis and machine intelligence, 2012, 34(11), (pp. 2274-2281.).
Yoon, H., Elanwar, H., Choi, H., Golparvar-Fard, M., & Spencer, B. F. Target-free approach for vision-based structural system identification using consumer-grade cameras. Structural Control and Health Monitoring, 2016, 23(12), (pp. 1405-1416.).
Feng, D., & Feng, M. Q. Computer vision for SHM of civil infrastructure: From dynamic response measurement to damage detection-A review. Engineering Structures, 2018, 156, (pp. 105-117.).
Chen, J. G., Davis, A., Wadhwa, N., Durand, F., Freeman, W. T., & Büyüköztürk, O. Video Camera-Based Vibration Measurement for Civil Infrastructure Applications. Journal of Infrastructure Systems, 2016, 23(3), (pp. B4016013:1-B4016013:11.).
Brownjohn, J. M. W., Xu, Y., & Hester, D. Vision-based bridge deformation monitoring. Frontiers in Built Environment, 2017, 3, 23.
Guo, J. Dynamic displacement measurement of large-scale structures based on the Lucas-Kanade template tracking algorithm. Mechanical Systems and Signal Processing, 2016, 66, (pp. 425-436.).
American Society of Civil Engineers (2017). Infrastructure report card, https://www.infrastructurereportcard.org/.
Chen, W.F and Duan, L. (2014). Bridge Engineering Handbook (2nd Edition): Construction and maintenance. CRC Press, Boca Raton, (pp. A-629) *Separated into 6 separate PDF's due to size*.
Zhao, Y., & Roddis, W. M. K. (2004). Fatigue Prone Steel Bridge Details: Investigation and Recommended Repairs, K-TRAN: KU-99-2, Final Report Kansas Department of Transportation, Topeka, KS.
McElrath, K. S. (2015). Field, Laboratory, and Analytical Investigation of Angles-with—Plate Retrofit for Distortion-Induced Fatigue in Steel Bridges (Doctoral dissertation, University of Kansas). http://hdl.handle.net/1808/20980 the date of last access: Sep. 1, 2018 (pp. A-345) *Separated into 3 separate documents due to size*.
Okugawa, M. Bolt loosening detection methods by using smart washer adopted 4SID. In Proceedings of the 45th AIAA/ASME/ASCE/AHS/ASC Structures, Structural Dynamics & Materials Conference. Apr. 2004. (pp. 1-12).
Sun, H., Liu, Q., & Fang, L. (2018). Research on Fatigue Crack Growth Detection of M (T) Specimen Based on Image Processing Technology. Journal of Failure Analysis and Prevention, 18(4). https://doi.org/10.1007/s11668-018-0493-6.

\* cited by examiner

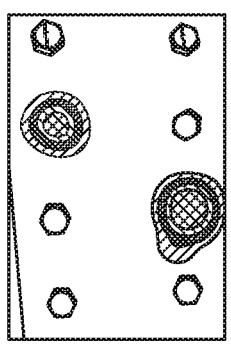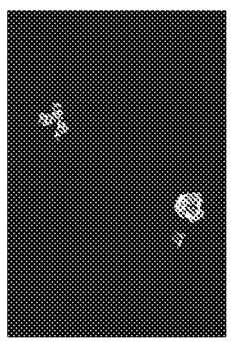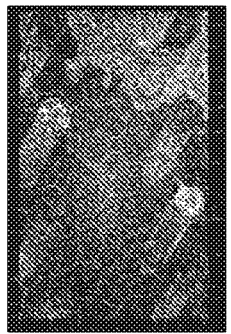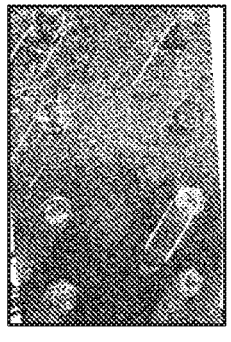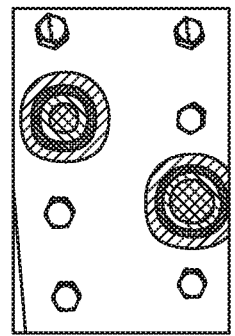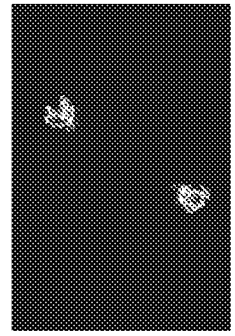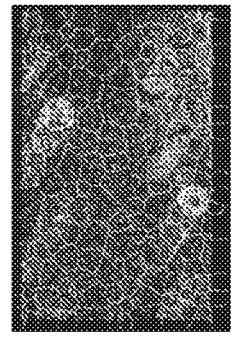
FIG. 11A
FIG. 11B

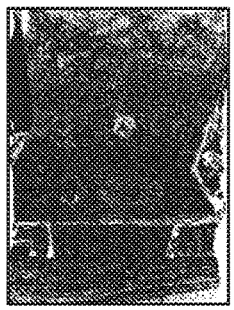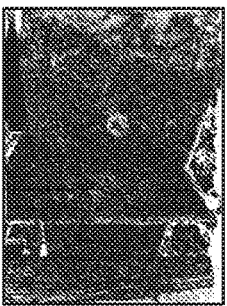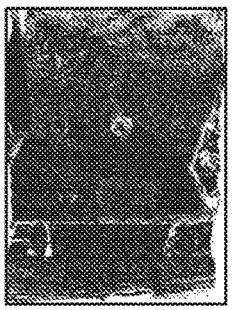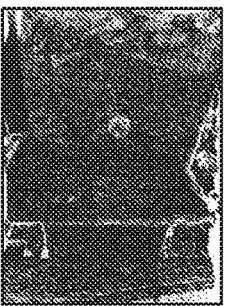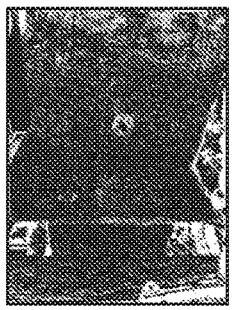
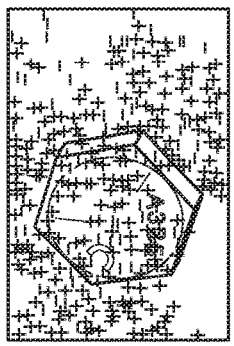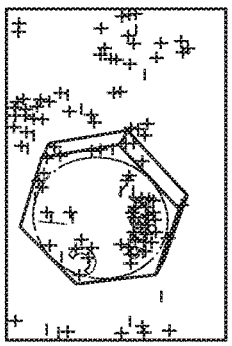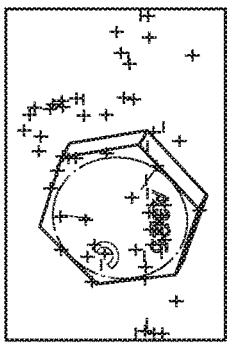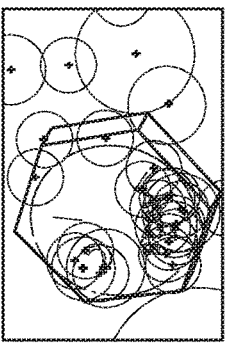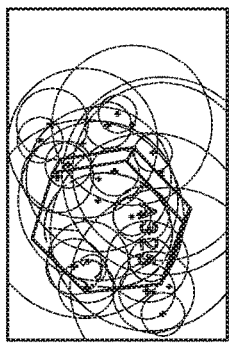
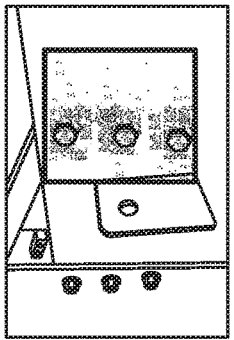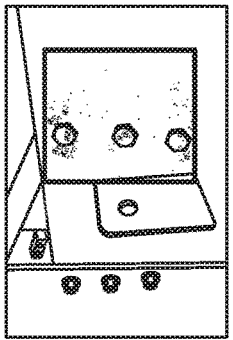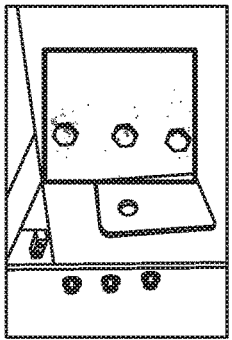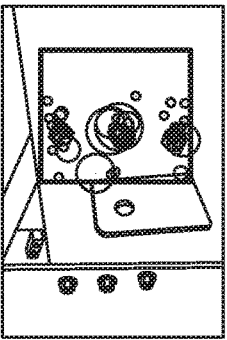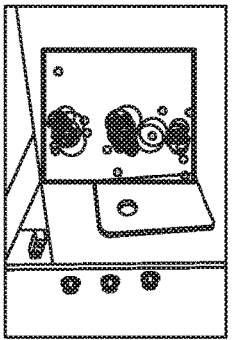
FIG. 13A    FIG. 13B    FIG. 13C    FIG. 13D    FIG. 13E

VISION-BASED FASTENER LOOSENING DETECTION

CROSS REFERENCE TO RELATED APPLICATIONS

The present application is a national stage entry pursuant to 35 U.S.C. § 371 of International Application No. PCT/US2019/023581, filed on Mar. 22, 2019, which claims the benefit of U.S. Provisional Application No. 62/647,136, entitled "Vision-Based Fastener Loosening Detection" filed on Mar. 23, 2018, both of which are hereby incorporated by reference herein in their entireties.

BACKGROUND

Civic infrastructure, such as buildings, roads, bridges, towers, etc. are susceptible to structural damage and possible failure due to the significant loads that they sustain over long periods of time. In particular, bolted steel joints are prone to structural damage over long service periods due to self-loosening of bolts, mainly caused by repetitive loads and vibrations.

Self-loosening of bolts caused by repetitive loads and vibrations is one of the common defects that could weaken the structural integrity of bolted steel joints in civil structures. Many existing approaches for bolt loosening detection are based on physical sensors, hence, they require extensive sensor deployments, which may limit their abilities for cost-effective detection of loosened bolts in a large number of steel joints. Additionally, the extra work is required for the installation of sensors and cables, leading to complex and expensive monitoring systems.

SUMMARY

According to one embodiment, a method includes capturing a first image of a fastener at a first time, capturing a second image of the fastener at a second time, performing a feature-based image registration to create a third image, performing an intensity-based image registration to create a fourth image, determining registration errors based at least in part on a comparison of the first image and the fourth image, and performing a feature enhancement process on the registration errors to determine whether the fastener has loosened between the first time and the second time.

According to another embodiment, a system for fastener loosening detection can include a capture device and at least one computing device. The at least one computing device can be configured to obtain a first image of a fastener at a first time based at least in part on the capture device, obtain a second image of the fastener at a second time based at least in part on the capture device, perform a feature-based image registration to create a third image, perform an intensity-based image registration to create a fourth image, determine registration errors between the first image and the fourth image, and perform a feature enhancement process on the registration errors to determine whether the fastener has loosened between the first time and the second time.

According to another embodiment, a non-transitory computer-readable medium can embody a program executable by one or more computing devices. The program can cause the one or more computing devices to capture a first image of a fastener at a first time, capture a second image of the fastener at a second time, perform a feature-based image registration to create a third image, perform an intensity-based image registration to create a fourth image, determine registration errors between the first image and the fourth image, and determine whether the fastener has loosened between the first time and the second time based at least in part on a feature enhancement process algorithm and the registration errors.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIGS. 11A and 11B illustrate a comparison of the fastener loosening detection results using two different image resolutions using the proposed vision-based approach according to aspects of the embodiments described herein.

FIGS. 13A-E illustrate a comparison of the performance of the Shi-Tomasi features for the feature-based image registration with other common types of feature-based image registration processes according to aspects of the embodiments described herein.

DETAILED DESCRIPTION

Figure 1:
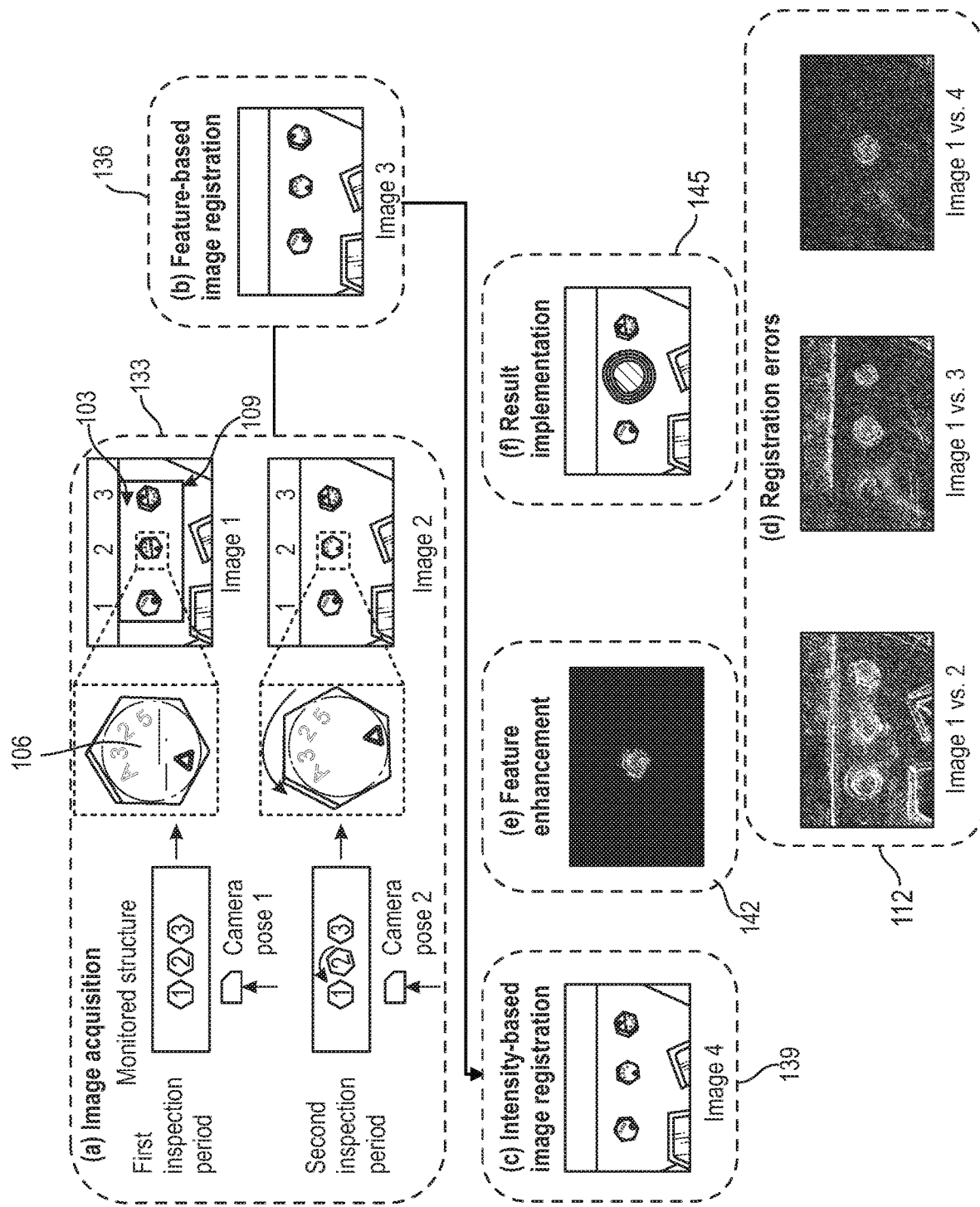
FIG. 1 illustrates a proposed vision-based fastener loosening detection approach according to various embodiments described herein.

As noted above, bolted steel joints are prone to structural damage over long service periods due to self-loosening of bolts, mainly caused by repetitive loads and vibrations. Bolt loosening leads to a loss of clamping force acting on the joint, further causing stiffness degradation, and potentially structural failure. Therefore, monitoring health conditions of bolts in a timely fashion is essential to structural integrity as appropriate replacements or retrofits can be applied before the steel joints reach critical conditions.

Human visual inspection has been commonly applied to detect bolt loosening in civil structures. For example, the Federal Highway Administration (FHWA) requires routine inspections in two-year intervals for highway bridges in the United States. Trained bridge inspectors visually detect and record structural defects in bridges, including bolt loosening during inspections. However, human inspection is labor intensive and less effective as bolts may loosen between inspection intervals. More importantly, inspection results may contain errors due to inconsistencies in inspection skills and ability to interpret data among inspectors.

Advanced bolt loosening detection technologies have been developed using in the field of structural health monitoring (SHM) and nondestructive testing (NDT). Nevertheless, the successes of these methods may rely on extensive work of human operations and/or sensor deployments, which could be costly and less flexible for rapid inspections of bolted steel joints in civil structures.

Computer vision-based technologies have received significant attentions in the SHM community due to the benefits of being low-cost, easy-to-deploy, and contactless. Several vision-based approaches have been reported for monitoring health conditions of civil structures at both global and local scales. In the field of vision-based fastener loosening detection, edge detection-based techniques have been used. However, these edge detection-based techniques compare the nut boundary (i.e. edges) before and after the nut rotation to determine loosening of the nut, which limits flexibility for automatically processing a large volume of images. Other approaches have combined vision-based technologies with machine learning algorithms to achieve a fastener loosening detection. However, prior knowledge about the damage state of the bolt (i.e. classifications of loosened bolt and tightened bolt) is required in order to train the machine learning algorithm, and the training procedure has to be repeated for new types of bolts with different dimensions or shapes. The above mentioned drawbacks limit the suitability of existing computer vision-based techniques.

In the context outlined above, a new computer vision-based bolt loosening detection method using image registration is described herein. The approach is based on mapping images at different inspection periods into the same coordinate system and uncovering differential features caused by the loosened bolt. This approach does not require extensive operations for finding the rotation of the nut's boundaries and does not require prior knowledge about the monitored structure (such as bolt types) or damage state of the bolt. In these regards, the present approach is more flexible and cost-effective for engineering applications. The detection result of this approach is also presented for easy interpretation such that direct actionable decisions can be made to conduct condition-based maintenance procedures. The approach can include detecting loosened fasteners, such as bolts, nuts, etc., in captured images. Furthermore, when equipped with autonomous platforms, such as unmanned aerial vehicles (UAVs), vision-based SHM could bring higher flexibility and cost-effectiveness to structural inspection.

Turning to the drawings, FIG. 1 illustrates a proposed vision-based fastener loosening detection approach according to various embodiments described herein. As shown in FIG. 1, a bolted steel joint 103 (the monitored structure) comprises bolt 106 and is evaluated in two inspection periods, and bolt 106 is found to be loosened during the inspection interval. Two input images, denoted as Image 1 and Image 2, are collected by a camera during the two inspection periods at block 133. In various embodiments, the location of the camera relative to the bolted steel joint 103 may not be the same for the acquisition of the two images. Therefore, directly identifying the rotated bolt by overlapping the two input images is not possible. This can also be confirmed by the intensity comparison between Image 1 and Image 2, as shown in block 112, in which intensities of exactly matched pixels are illustrated as 0 (black), and intensities of unmatched pixels are in the region of 1 to 255 (grey to white), deepening on the level of their discrepancies.

In order to align two input images together, the approach applies a feature-based image registration method to transform Image 2 to Image 3 at block 136. The resulting Image 3 has the same coordinate system as Image 1. A region of interest 109 (ROI) may be assigned prior to this procedure as shown in Image 1. The purpose of defining the ROI 109 is to specify a region in Image 1 as the target region where Image 2 should match. In various embodiments, the ROI 109 covers a group of bolts and their adjacent structural surface and excludes unnecessary elements in the scene (e.g. the wall in the background in Image 1). After the feature-based image registration, the matching performance is improved as shown in the intensity comparison between Image 1 and 3, as shown in block 112. Nevertheless, misalignments (i.e. registration errors) still exist, especially around the areas of Bolt 1 and Bolt 3, even if they are intact during the inspection interval.

To further reduce registration errors, the approach then utilizes an intensity-based image registration method at block 139, which transforms Image 3 into Image 4 to non-rigidly match Image 1. As can be found in the intensity comparison between Image 1 and Image 4 (FIG. 1d), registration errors are significantly reduced around Bolt 1 and Bolt 3, while these errors still exist around the loosened Bolt 106 due to the bolt rotation. These errors are treated as the bolt loosening features which are introduced by multiple sources during the bolt rotation, such as: hexagon boundaries of the bolt head, the mark of A325, and other surface textures on the bolt head surface. Next, the approach enhances the above bolt loosening features by filtering out adjacent noisy contents in the registration errors at block 142. Next, the enhanced bolt loosening features obtained at block 142 are applied to the original input image (Image 1)

so that the loosened bolt 106 can be directly visualized at block 145, and informed actionable decisions can be made to perform appropriate rehabilitations and/or retrofits to the monitored steel joint.

The feature-based image registration effectively aligns two input images into the same coordinate system based on a predefined ROI. However, small misalignments are usually associated with feature-based image registration. The intensity-based image registration, on the other hand, is able to adjust small misalignments but may have difficulty handling significant misalignments if the input images are taken from very different camera poses. By adopting these two image registration processes in a successive manner, the misalignments between two input images can be gradually reduced through each registration process. It should be noted that the algorithm for feature-based image registration is not tied to a particular intensity-based image registration method, and vice versa.

Image Acquisition

In various embodiments, a consumer-grade digital camera can be used for image acquisition. For example, a Nikon D7100 camera and a Sigma 17-50 mm lens with the auto shooting mode may be utilized. The distance between the camera and the monitored structure may depend on the resolution of the camera, and a typical distance is 20 to 50 cm. In various embodiments, the camera can be held by hand during image acquisition, and images can directly capture the detected bolt and its adjacent structural surface without any obstructions. Ambient lighting conditions are generally acceptable. The image plane can be either parallel or skew to the monitored structural surface. When collecting the images at different inspection periods, the lighting condition and camera pose should be similar between inspection periods in order to produce the optimal result. This approach does not require camera calibration.

Feature-Based Image Registration

The purpose of feature-based image registration is to align two images into the same coordinate system using matched features (i.e. correspondences). For this approach to be viable, features (also known as feature points, corner points, or key points) are first detected in both images. Then, a matching algorithm is applied to the images to find matched features between two images, based on which a geometric transformation matrix can be estimated to transform the second image to the coordinate system of the first image.

Figure 2:
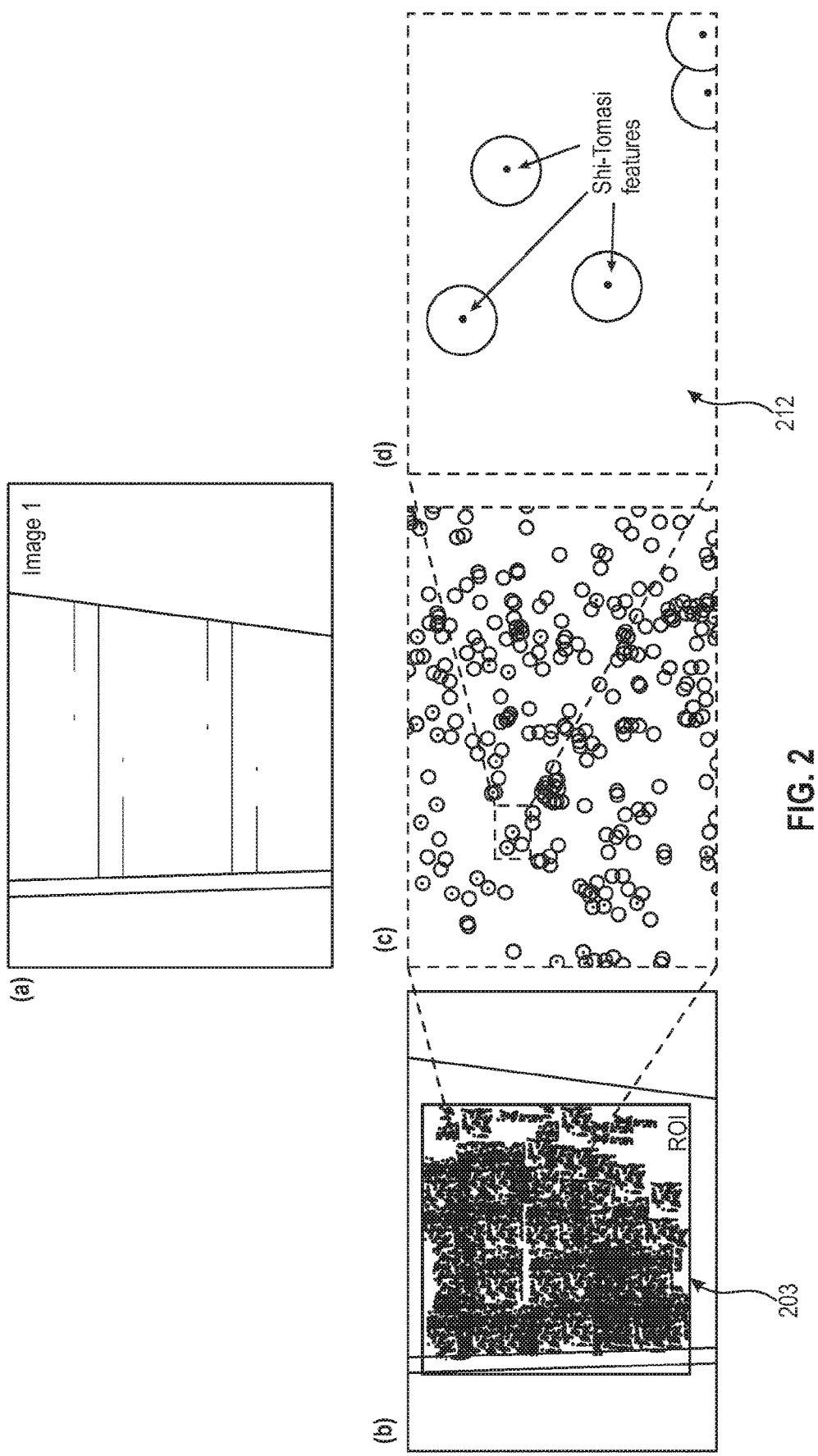
FIG. 2 illustrates an example of the feature-based image registration algorithm according to various embodiments described herein.

FIG. 2 illustrates an example of the feature-based image registration algorithm according to various embodiments described herein. FIG. 2 illustrates two input images of a concrete column taken by a digital camera with a resolution of 6000 pixels×4000 pixels. The feature-based image registration algorithm can be performed to match the front face of the column in two input images. First, Image 1 can be denoted as the first input image (FIG. 2a). A ROI (3500 pixels×3500 pixels) can be selected in Image 1, which is shown in FIG. 2b, to cover the front face of the column. Next, a feature-based image registration algorithm, such as a Shi-Tomasi algorithm, can be applied to the ROI in Image 1 to extract features. The extracted features are denoted as feature set 203. This feature extraction procedure is flexible and can be achieved by many other feature types as well. As can be seen in FIG. 2d, feature points 206, 209, and 212 are typical Shi-Tomasi features, which are based on the unique intensity change at a localized region in both horizontal and vertical directions.

Figure 3:
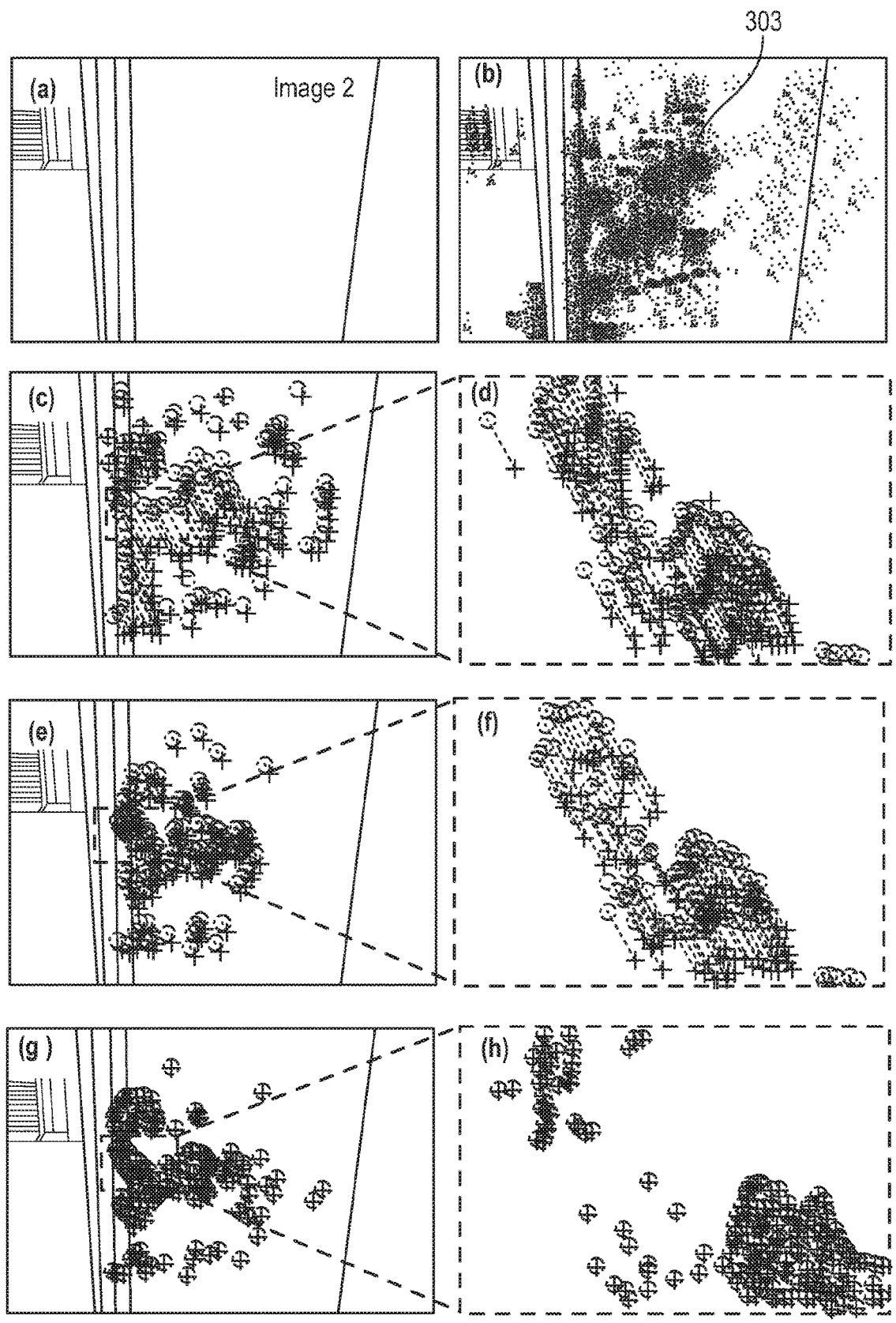
FIG. 3 illustrates certain aspects of the feature-based image registration algorithm according to various embodiments described herein.

FIG. 3 illustrates certain aspects of the feature-based image registration algorithm according to various embodiments described herein. FIG. 3a illustrates the second image of the concrete column captured at a different position relative to the image in FIG. 2, denoted as Image 2. Shi-Tomasi features are extracted for the entire region of Image 2, denoted as feature set 303 in FIG. 3b. Next, the approach can use the Kanade-Lucas-Tomasi (KLT) tracker or other algorithm to match each point in feature set 203 (FIG. 2B) to any potential points in feature set 303. In this example, a detection application executed in a computing device matched 1,370 features that were found in FIG. 3c, where the circles are features in Image 1 and the crosses represent features in Image 2. Among all the matched features, some outliers can be found (FIG. 3d), indicating matching failures. These outliers can be further eliminated utilizing, for example, a Maximum Likelihood Estimation Sample Consensus (MLESAC) algorithm, and new matched results (i.e. inliers) are shown in FIG. 3e and FIG. 3f. Applying the MLESAC algorithm to Image 2 yields, for example, a total of 1,175 matched features, based on which a projective geometric transformation matrix can be estimated so that Image 2 can be registered to the coordinate system of Image 1. The projective geometric transformation can remove the projective distortion between Image 1 and Image 2 taken under different camera poses. The feature points can be matched to generate an image after image registration is performed, an example of which is illustrated in FIG. 3g and FIG. 3h where the circles (features of Image 1) match the crosses (features of Image 2).

Intensity-Based Image Registration

Figure 4:
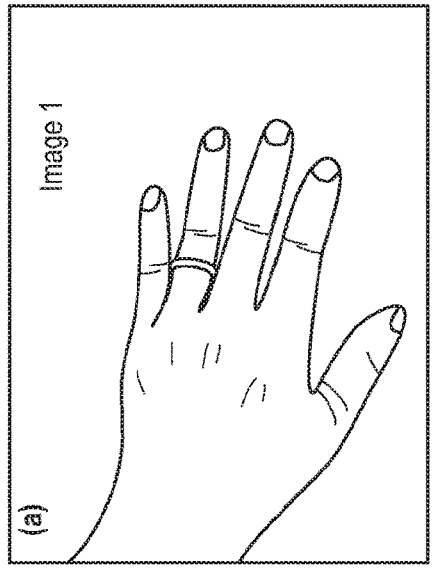
FIG. 4 illustrates an example of the principle of intensity-based image registration according to various embodiments described herein.
Figure 4:
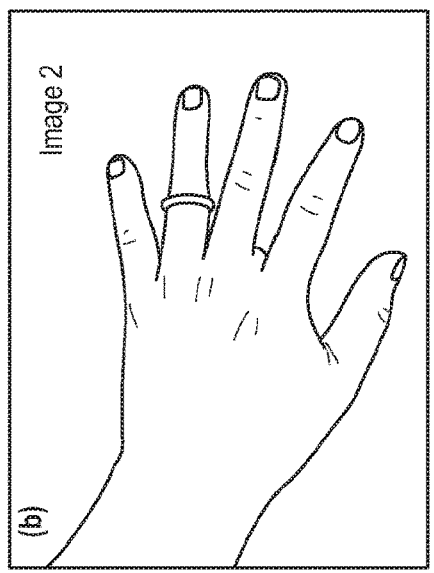
Figure 4:
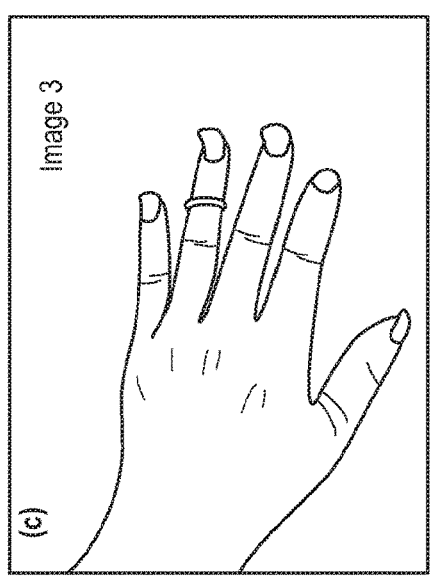
Figure 4:
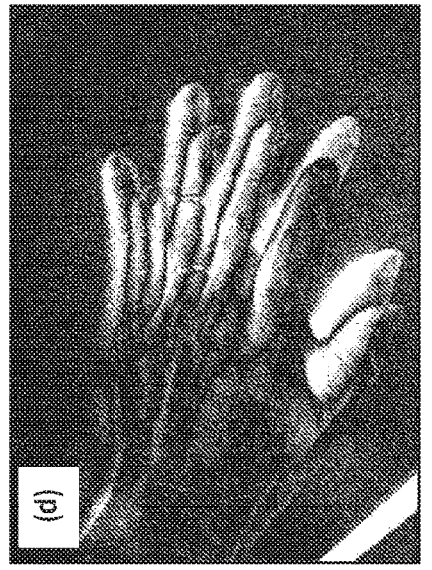
Figure 4:
Figure 4:

In some embodiments, the purpose of intensity-based image registration is to further align two images based on the images intensity distributions. Instead of geometric transformation in feature-based image registration, intensity-based image registration is a non-rigid transformation process. With reference to FIG. 4, shown is an example of images illustrating the principle of intensity-based image registration according to various embodiments described herein. The images include a first image at FIG. 4a and a second image at FIG. 4b illustrating the same hand under different poses. Due to the different locations of the image capture device in these two images, feature-based image registration may face difficulties in aligning the two images. The intensity-based image registration approach uses, for example, an algorithm to non-rigidly register Image 2 of FIG. 4b to Image 3 of FIG. 4c, such as, the algorithm proposed by Thirion[1]. A typical three-level pyramid with 500, 400, and 200 iterations is adopted during this procedure. FIGS. 4d and e further evaluate the registration errors through intensity comparisons. Instead of misalignment occurring in the unregistered images (Image 1 and Image 2), the two images are well aligned after the registration (FIG. 4e).

Despite the great performance of intensity-based image registration, registration errors may still occur if abrupt intensity changes occurred in Image 2. In this example, the location of the ring at the ring finger is changed between two image acquisitions, where the ring in Image 2 is closer to the fingertip. Such an action induces abrupt intensity changes in a localized region, leading to registration errors as shown in FIG. 4f. However, from the perspective of detecting bolt loosening, such registration errors can be utilized for identifying discrepancies between two images, serving as good features for bolt loosening detection.

Feature Enhancement

Figure 5:
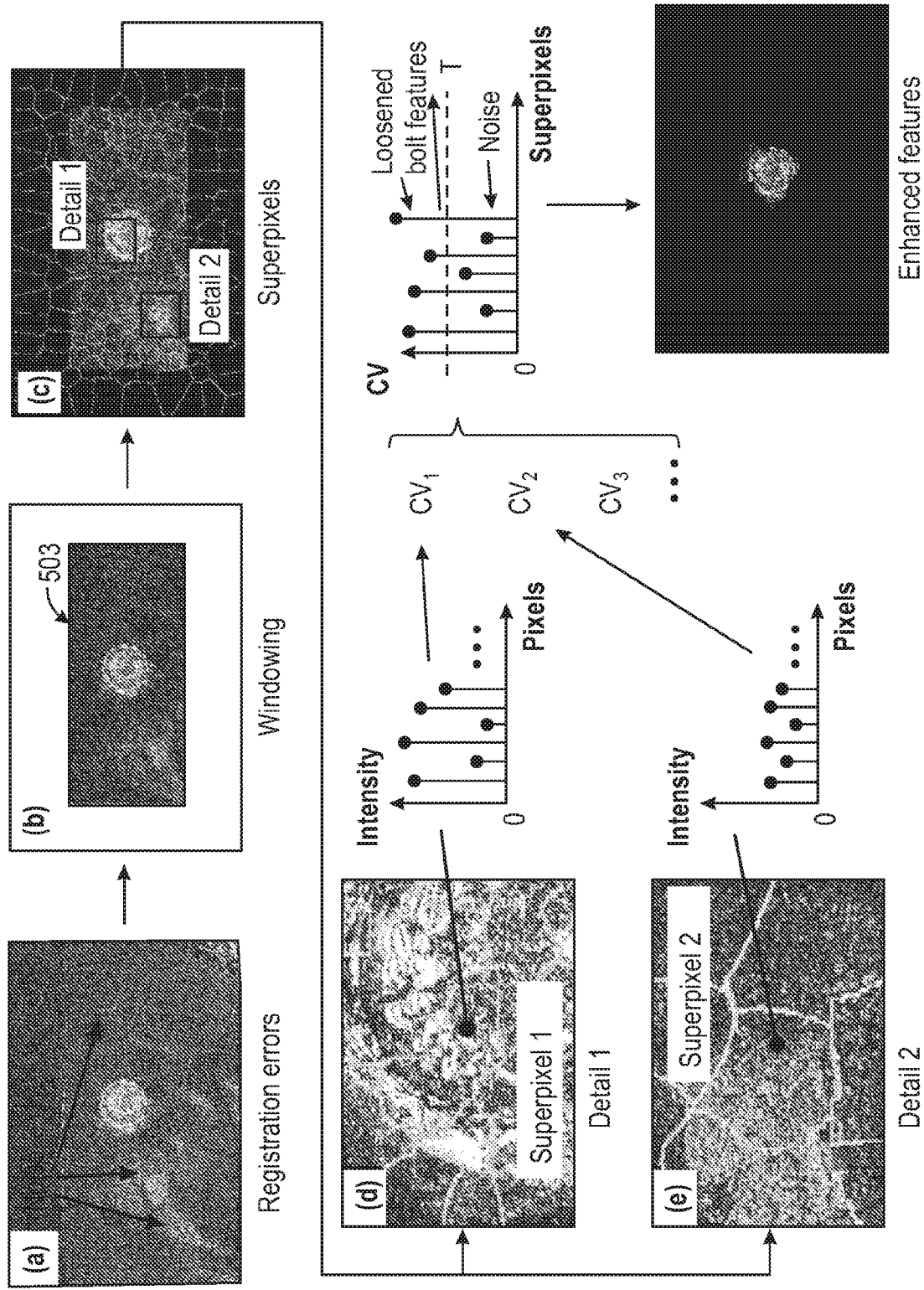
FIG. 5 illustrates an example of the principle of feature enhancement according to various embodiments described herein.

FIG. 5 illustrates an example of the principle of feature enhancement according to various embodiments described herein. Once the feature-based image registration process and the intensity-based image registrations process are completed successively, the loosened bolt can be identified through registration errors as shown in FIG. 5a. Nevertheless, directly identifying the loosened bolt would still require human intervention as the loosened bolt is surrounded by noise content (FIG. 5a). The next step in the approach is to remove the noise content so that bolt loosening features around Bolt 2 can be enhanced. A number of image processing techniques are adopted in this procedure. First, a rectangular window 503 is applied to the registration errors (FIG. 5a) so that unrelated results can be filtered out by assigning 0 intensity to the pixels outside the window. The dimensions of the window are predefined as the same sizes of the ROI 109 (shown in FIG. 1) prior to feature-based image registration.

Next, an image segmentation method, such as, for example a method proposed by Achanta et al.[2], is performed to segment registration errors (FIG. 5b) into a series of localized regions, termed as superpixels, as shown in FIG. 5c. For each superpixel i, the coefficient of variation of intensities at all pixels within this superpixel is computed and denoted as $CV_i$. Then, by applying a cutoff threshold T, noise content can be eliminated from registration errors so that bolt loosening features can be preserved (FIG. 5f). To explain, suppose two typical superpixels are selected in FIG. 5c, where Superpixel 1 is from the loosened bolt, and Superpixel 2 represents the noise content. As shown in FIG. 5d and FIG. 5e, magnitudes of intensities change dramatically around the loosened bolt, such as Superpixel 1, while transit occurs smoothly in other regions, such as Superpixel 2. In this regard, extracting coefficients of variation CVs of superpixels can efficiently separate the loosened bolt from its background noise. Hence, a feature enhancement algorithm is proposed by assigning 0 intensities to superpixels whose CVs are less than a predefined threshold T. For superpixels with CVs that are larger than the predefined threshold T, no action is required. Utilizing this algorithm, the noise content can be removed, and the final result is shown in FIG. 5f.

Result Implementation

Figure 6:
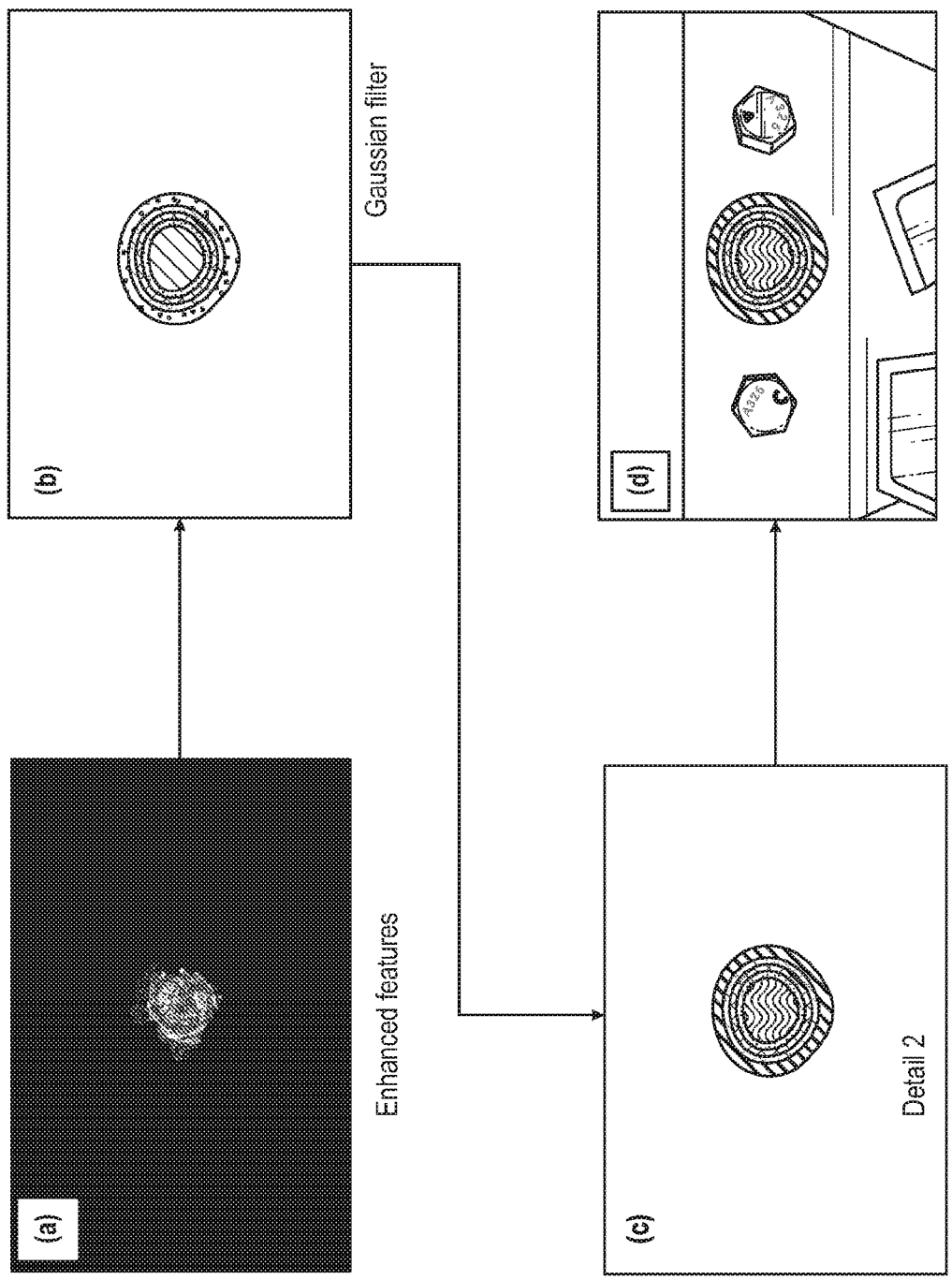
FIG. 6 illustrates an example of the principle of result implementation according to various embodiments described herein.

FIG. 6 illustrates an example of the principle of result implementation according to various embodiments described herein. The purpose of result implementation is to map the bolt loosening features (FIG. 6a) to the original input image so that the loosened bolt can be easily visualized. To achieve this goal, a two dimensional Gaussian filter is applied to FIG. 6a to blur the bolt loosening features (FIG. 6b). Then, the filtered bolt loosening features are further converted to RGB channels using the following rules: 1) black color in FIG. 6b is converted into white color, and 2) white color in FIG. 6b is converted into red color. Finally, by setting up the transparency levels and overlapping RGB channels to the original input image, the loosened bolt can be successfully identified (FIG. 6d).

Experimental Validation

To validate the approach in accordance with various embodiments of the present disclosure, three experimental tests were conducted in the laboratory. A digital camera was adopted for image acquisition. The resolution of collected input images was 6000 pixels×4000 pixels. Ambient lighting conditions were applied to all the tests during image acquisition. The bolts in the tests are made by ASTM A325 steel with diameter of 19.05 mm (¾ in.), which are a common type of high strength bolts applied in steel construction in the United States. Shi-Tomasi features and the KLT tracker are adopted for feature-based image registration.

Figure 7:
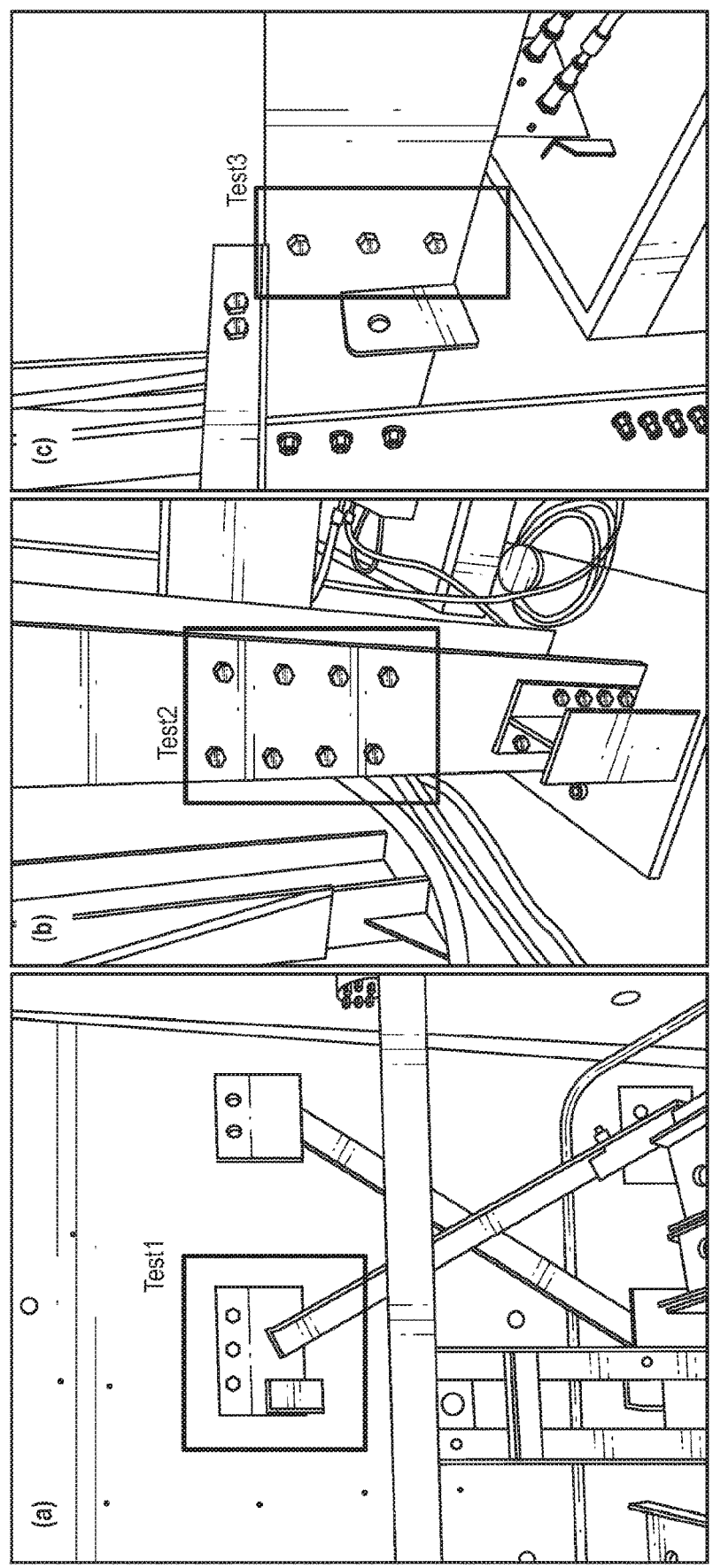
FIG. 7 illustrates an example experimental validation test setup according to aspects of the embodiments described herein.

FIG. 7 illustrates an example experimental validation test setup according to aspects of the embodiments described herein. FIG. 7 shows the tested steel joints used in various experiments. The steel joint in Test 1 was from a gusset plate in a cross frame, the steel joint in Test 2 was a steel column flange, and the steel joint in Test 3 was a web region of a steel girder. Table 1 summaries the different testing parameters in three experiments, in which a total number of bolts, loosened bolts, surface textures, and camera orientations vary in order to validate the performance of the present approach. The Matlab Computer Vision Toolbox was adopted for applying all the algorithms mentioned described herein.

TABLE 1

Test Matrix

| Test number | Description | Total bolts | Loosened bolts | Structural surface | Cutoff threshold T | Relation of image plane to the monitored surface |
|---|---|---|---|---|---|---|
| Test 1 | Gusset plate | 3 | 1 (Bolt 2 in FIG. 8a) | Painted | 50 | Parallel |
| Test 2 | Column flange | 8 | 2 (Bolt 3 and 6 in FIG. 9a) | Unpainted | 200 | Parallel |
| Test 3 | Girder web | 3 | 1 (Bolt 2 in FIG. 10a) | Mixed | 50 | Skewed |

Figure 8:
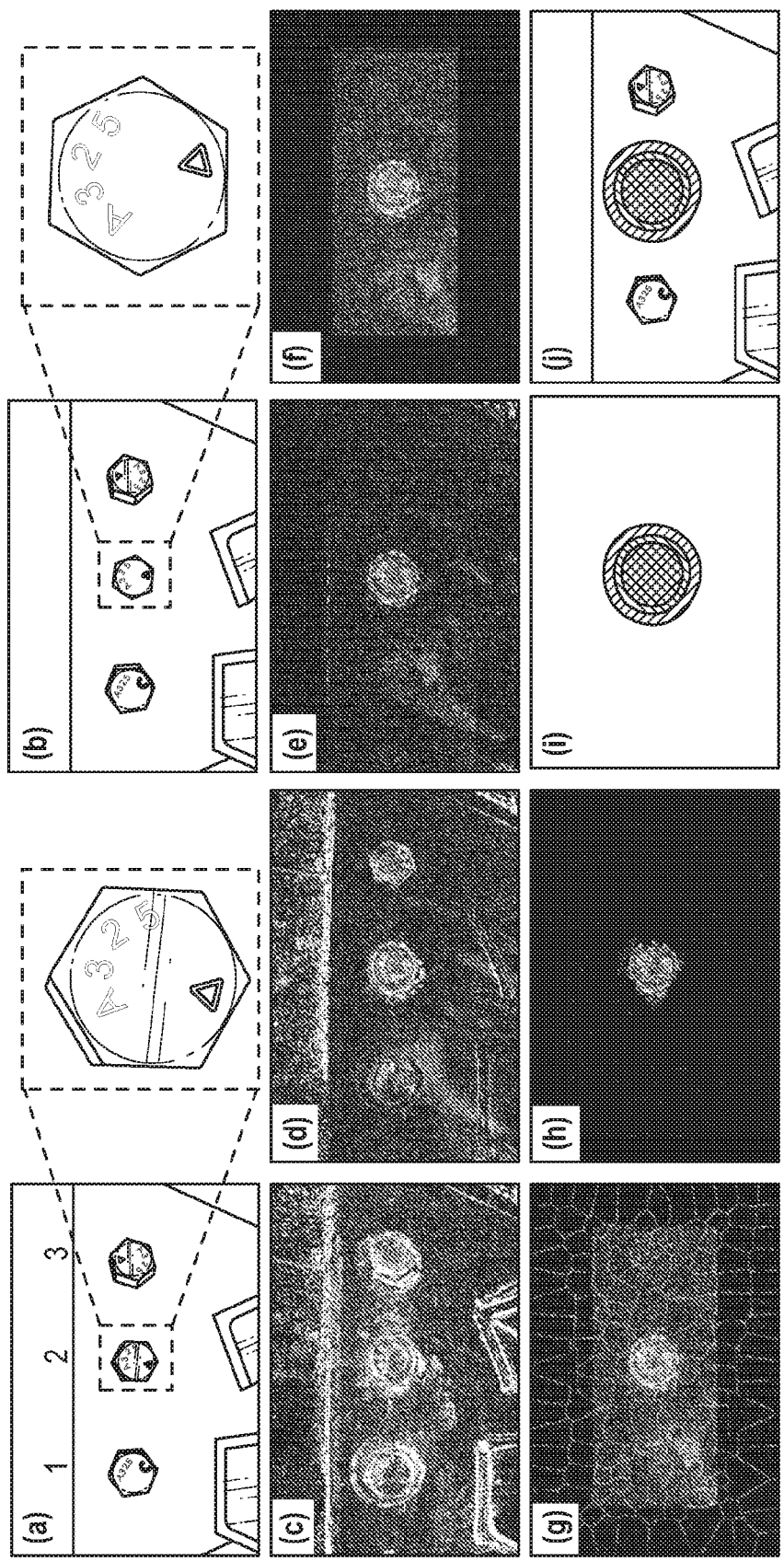
FIG. 8 illustrates results of an example experimental validation test setup according to aspects of the embodiments described herein.

FIG. 8 illustrates results of an example experimental validation test setup according to aspects of the embodiments described herein. The three bolts (FIG. 1) are in the gusset plate denoted as Bolt 1, Bolt 2, and Bolt 3 in Image 1 (FIG. 8a). During the inspection interval, Bolt 2 was rotated, and then Image 2 was collected as shown in FIG. 8b. FIG. 8c shows the initial intensity comparison of two images where significant errors can be found due to the different camera poses. To improve the matching performance, the feature-based and intensity-based image registrations are applied successively, and their registration errors are shown in FIG. 8d and FIG. 8e. The feature-based image registration is based on the ROI defined near the group of bolts (see the red block in FIG. 8a). Then a number of image processing techniques are further applied in order to enhance the bolt loosening features and visualize the loosened bolt as discussed herein. These techniques include windowing (FIG. 8f), superpixel segmentation (FIG. 8g), feature enhancement (FIG. 8h), Gaussian filtering (FIG. 8i), and result overlapping (FIG. 8j).

Figure 9:
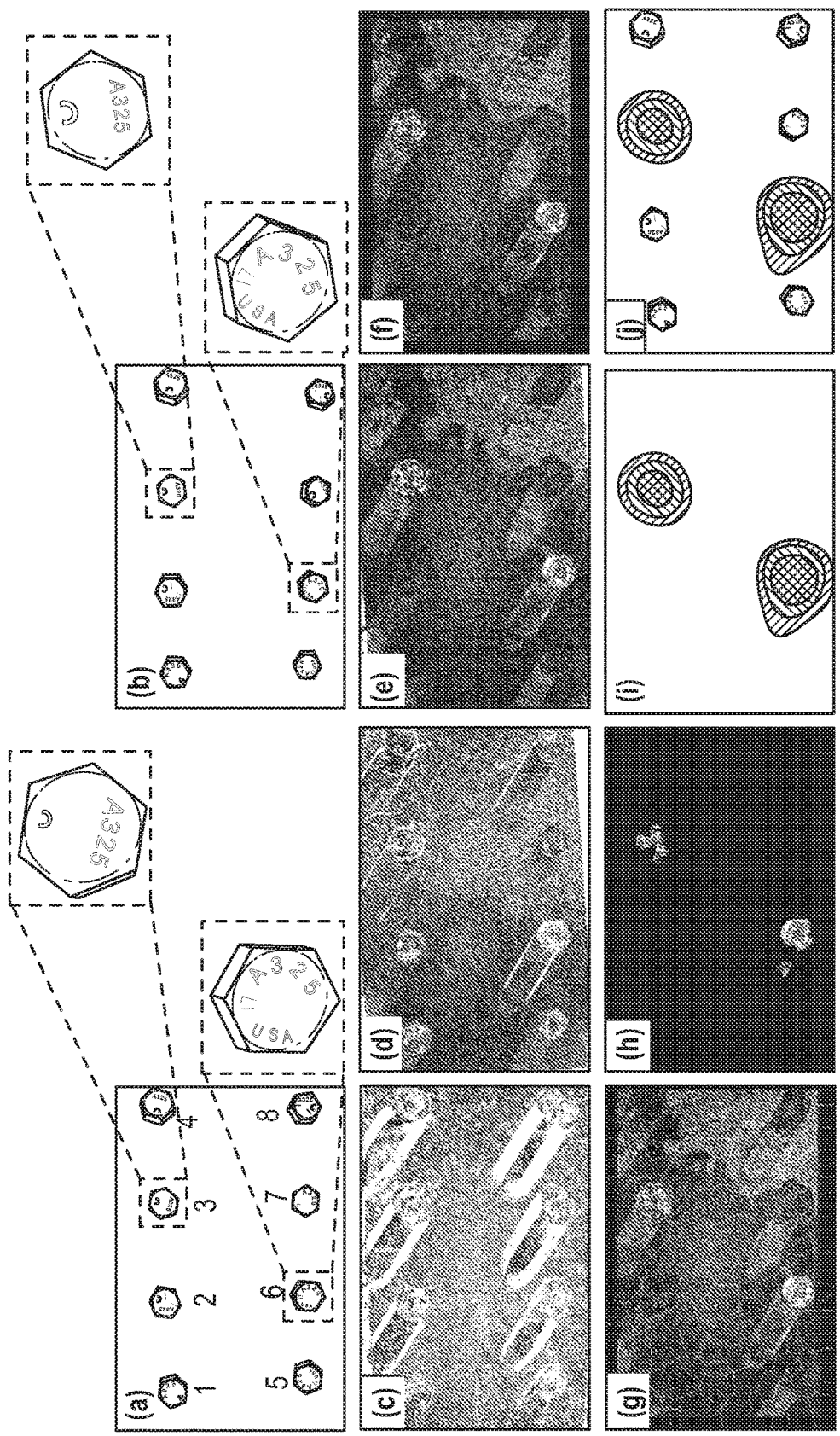
FIG. 9 illustrates results of an example experimental validation test setup according to aspects of the embodiments described herein.

FIG. 9 illustrates results of an example experimental validation test setup according to aspects of the embodiments described herein. Shown in FIG. 9 are the experimental results of Test 2 (FIG. 7). Eight bolts were adopted in Test 2, and two of them (i.e. Bolt 3 and Bolt 6) experienced rotations during the inspection interval, as shown in FIG. 9b. Nevertheless, this approach is still able to identify the loosened bolts as illustrated in FIG. 9j.

Figure 10:
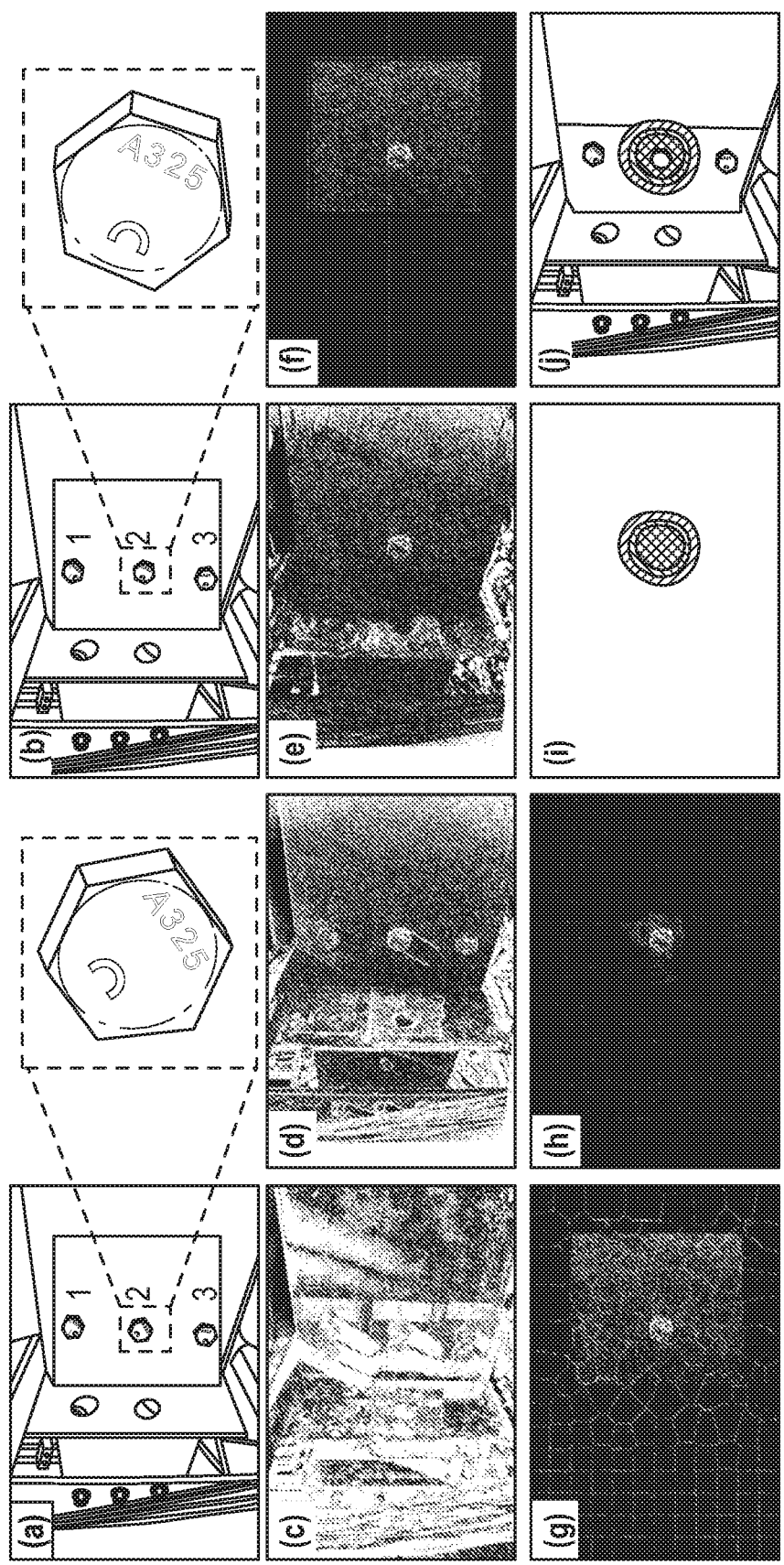
FIG. 10 illustrates results of an example experimental validation test setup according to aspects of the embodiments described herein.

FIG. 10 illustrates results of an example experimental validation test setup according to aspects of the embodiments described herein. Shown in FIG. 10 are the experimental results of Test 3 (FIG. 7), in which multiple conditions were varied in order to validate the performance of the approach of the present disclosure. In particular, the orientation of the camera was skewed to the monitored surface instead of being parallel to the fastener. The surface treatment of the structural surface, on the other side, was a combination of painted and unpainted, as can be seen in FIG. 7c. Prior to processing the images, the ROI (red block in FIG. 10a) should be selected to only cover the detected bolts and their adjacent structural surface, while excluding any background that is far away from the monitored surface. The benefit of such a selection is twofold: 1) the ROI can facilitate feature-based image registration process by specifying a localized region for matching potential correspondences, and 2) the ROI can also exclude unnecessary registration errors during the feature enhancement procedure (see FIG. 10f). As shown in FIG. 10j, the loosened bolt (i.e. Bolt 2) can be detected.

As a summary of these experimental results, the approach of the present disclosure can successfully detect and localize single or multiple loosened bolts from a group of bolts, regardless of the total number of bolts, structural surface textures, or camera orientations. The success of this approach, however, relies on tuning the cutoff threshold T, a parameter in the feature enhancement algorithm discussed above. As shown in Table 1, T is 50 in both Test 1 and Test 3, while T increases to 200 for Test 2 because more noise content occurred in the registration errors in Test 2, as demonstrated in FIG. 9f. A detailed discussion about the effect of T will be presented in Section 4.4.

Input Image Resolution

FIG. 11 illustrates a comparison of the fastener loosening detection results using two different image resolutions and the proposed vision-based approach according to aspects of the embodiments described herein. The resolution of input images is 6000 pixels×4000 pixels for experimental validation. However, lower resolution images can achieve successful results. A parametric study is performed by downsizing the original input images and repeating the bolt loosening detection procedure. The two input images of Test 2 (FIG. 7) are used to understand the effect of resolution on successfully determining fastener loosening. Two image resolutions are selected including: 1) 6000 pixels×4000 pixels, as shown in FIG. 11a and 2) 750 pixels×500 pixels, as shown in FIG. 11b. FIG. 11 summarizes the bolt loosening detection results for each scenario.

As shown in FIG. 11, similar registration errors can be found after two image registration processes. The superpixel segmentation also demonstrates robust performance, despite a slightly different segmentation layout in each scenario. Nevertheless, two loosened bolts can be consistently localized regardless of the image resolutions. This further verifies that the key components of the present approach are insensitive against input image resolutions. This finding allows reductions of data storage and computational cost through the utilization of lower resolution images.

Rotation Angles of Bolt Head

Figure 12:
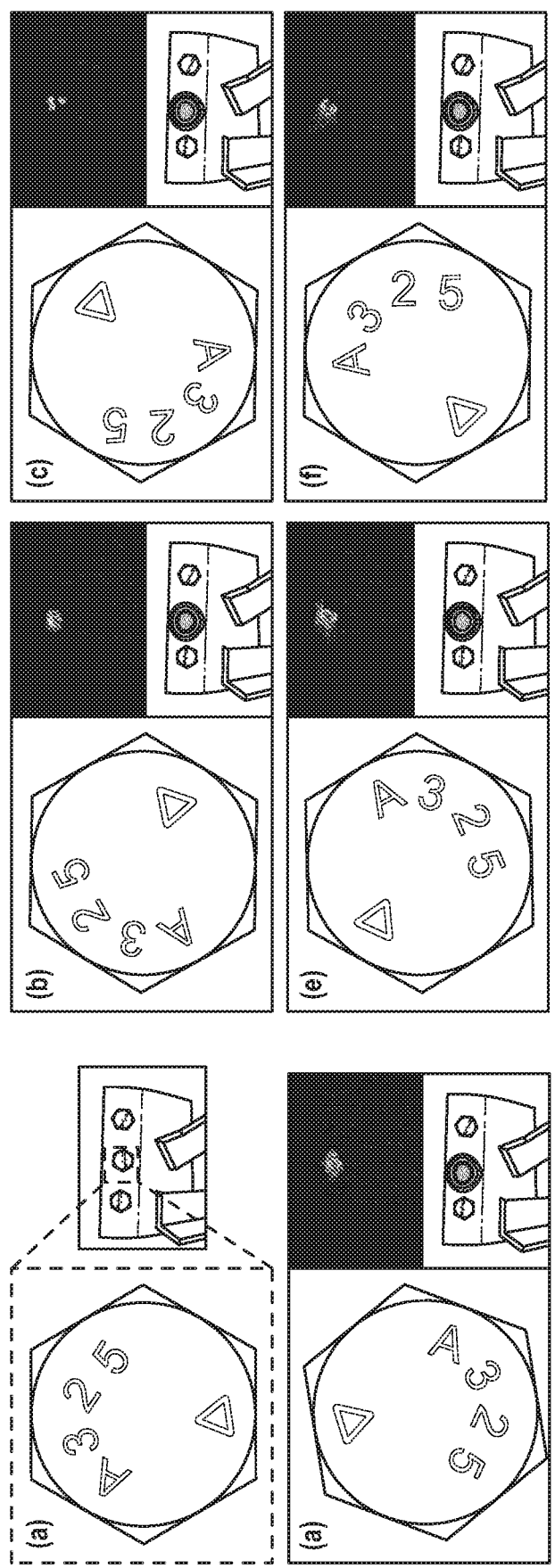
FIG. 12 illustrates a comparison of the fastener loosening detection results at various rotation angles using the proposed vision-based approach according to aspects of the embodiments described herein.

FIG. 12 illustrates a comparison of the fastener loosening detection results at various rotation angles using the proposed vision-based approach according to aspects of the embodiments described herein. The ability of the approach of the present disclosure to successfully identify fastener loosening for different rotation angles of the bolt head is demonstrated in FIG. 12. Setup of Test 1 (FIG. 7) was adopted in this investigation, where the middle bolt in FIG. 12a was subjected to a series of counterclockwise rotations of 60, 120, 180, 240, and 300 degrees, respectively. Images were taken at the initial stage with the unloosened bolt (FIG. 12a) and stages hereafter (FIG. 12b to FIG. 12f). Images with loosened bolts were further paired with the initial images for the purpose of bolt loosening detection. All images were collected by a digital camera. Image planes are parallel to the monitored surface. To enhance image processing efficiency, the original input images are downsized to 1500 pixels×1000 pixels. As can be seen in FIG. 12, the approach of the present disclosure can consistently localize the loosened bolt under different rotation angles.

Features for Tracking

The feature-based image registration adopted in this approach also shows great potential to be applied to other research fields in the SHM community, such as targetless displacement monitoring of civil structures FIG. 13 illustrates a comparison of the performance of the Shi-Tomasi features for the feature-based image registration with other common types of feature-based image registration processes according to aspects of the embodiments described herein. FIG. 13 shows a comparison of the performance of the Shi-Tomasi features (FIG. 13a) with an accelerated segment test (FAST) (FIG. 13b), Harris-Stephens (FIG. 13c), binary robust invariant scalable keypoints (BRISK) (FIG. 13d), and speeded up robust features (SURF) (FIG. 13de). Briefly, two input images of Test 3 in Section 3 (FIG. 10a and FIG. 10b) are adopted for the comparison. Five different types of features are extracted in the first input image within the ROI as shown in the first column of FIG. 13. Despite the total number and locations of these features (see the second column in FIG. 13), feature-based image registration can be successfully performed as shown in the third column of FIG. 13. As shown in the last columns of FIG. 13, registration errors can be significantly reduced after intensity-based image registration. In this regard, the loosened bolt can be consistently identified by this approach regardless of feature type.

Cutoff Threshold T of Image Segmentation

Figure 14:
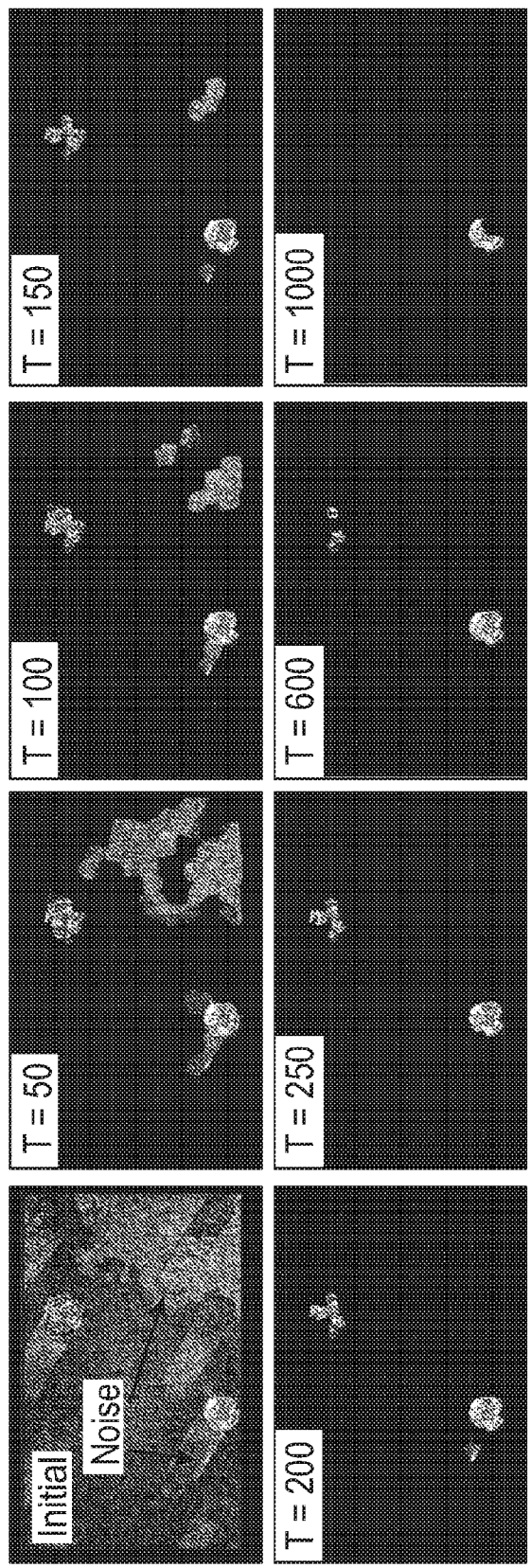
FIG. 14 illustrates a comparison of the results of the feature enhancement at various threshold levels using the proposed vision-based approach according to aspects of the embodiments described herein.

FIG. 14 illustrates a comparison of the results of the feature enhancement at various threshold levels using the proposed vision-based approach according to aspects of the embodiments described herein. As discussed above, a cutoff threshold T is used for eliminating noise content from the registration errors. Various experiments were performed to demonstrate the sensitivity of T in the process of feature enhancement. Two input images in Test 2 of Section 3 are adopted for this analysis, and results are shown in FIG. 14. As shown in FIG. 14, a larger cutoff threshold T can eliminate noise context in the initial registration errors; however, the bolt loosening features may also be deleted (see subfigure when T=1000). On the other hand, a smaller cutoff threshold T can preserve bolt loosening features. As a tradeoff, noise content may exist, as shown in the second subfigure when T=50, leading to challenges in localizing the loosened bolts. For such reasons, T=200 is adopted in the experiment in Section 2, while selecting a region of cutoff threshold T (from 200 to 600) may also be achievable for this particular dataset. A practical approach for determining the optimal cutoff threshold T would be a trial-and-error procedure. An initial T=50 is suggested for the tests in this study and can be further adjusted based on the tuning result.

Lighting Condition

Figure 15:
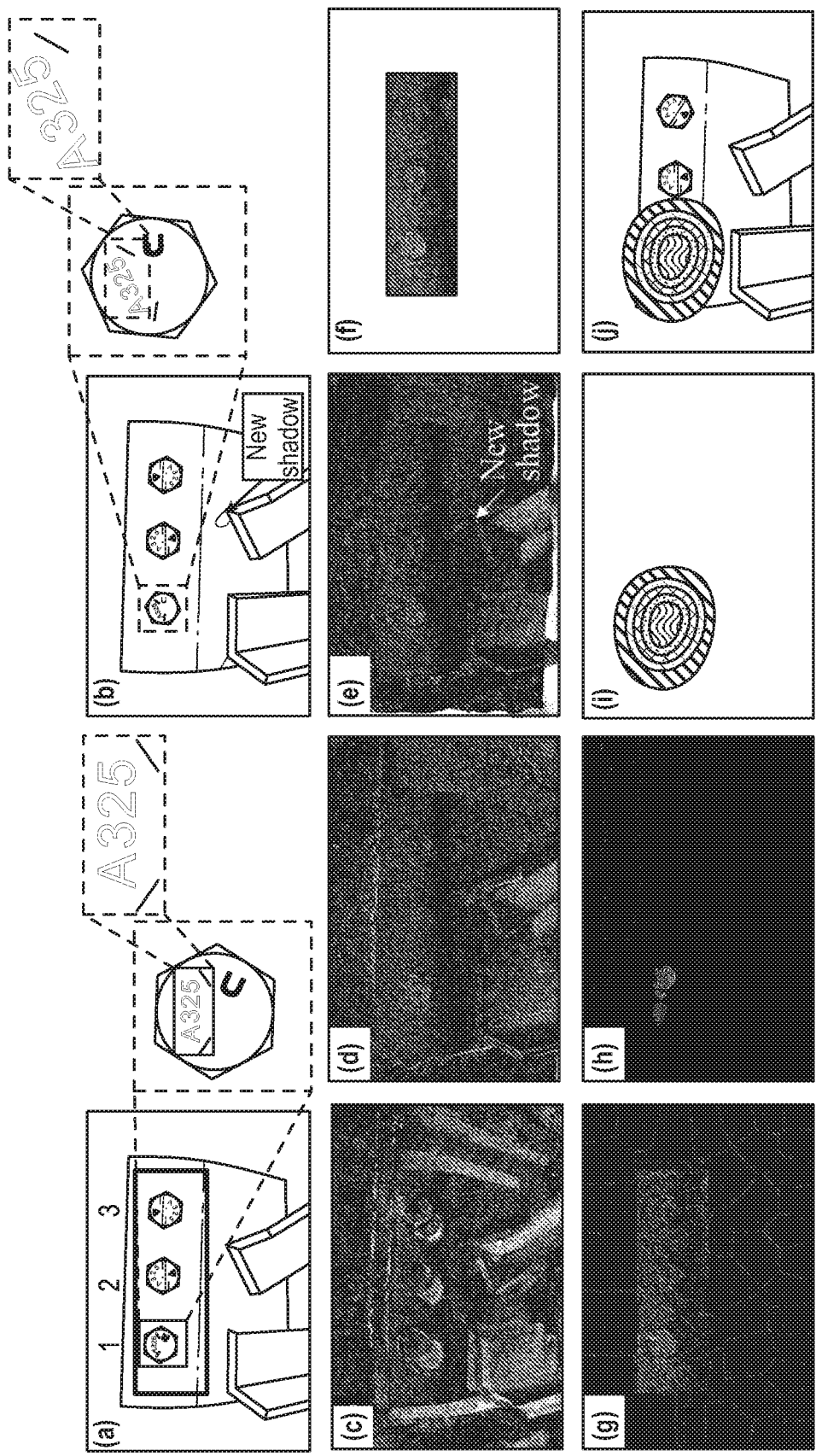
FIG. 15 illustrates a comparison of the fastener loosening detection results at lighting conditions using the proposed vision-based approach according to aspects of the embodiments described herein.

FIG. 15 illustrates a comparison of the fastener loosening detection results at lighting conditions using the proposed vision-based approach according to aspects of the embodiments described herein. Lighting condition is another important parameter in the approach of the present disclosure. Further tests were performed with varying lighting conditions. Setup of Test 1 was adopted in this analysis. As shown in FIG. 15b, the lighting condition varied by adding an additional light source with a floor lamp, leading to slight changes of shadows in the second input image. Bolt 1 (FIG. 15a) experienced a rotation under the inspection interval. Nevertheless, this approach can still detect the loosened bolt under such a condition.

Despite the success of the present approach in this particular investigation, a significant change of lighting condition around the bolts could affect performance as significant changes in lighting conditions would provoke extensive intensity change, inducing excessive registration errors. For instance, the new shadow of the angle caused by the lighting change denoted in the second input image (FIG. 15b) cannot be eliminated by the two image registration processes, hence the registration error appears in FIG. 15e. If such a change in lighting condition occurs around the bolts, the robustness of this approach would be affected.

Nut Loosening

Figure 16:
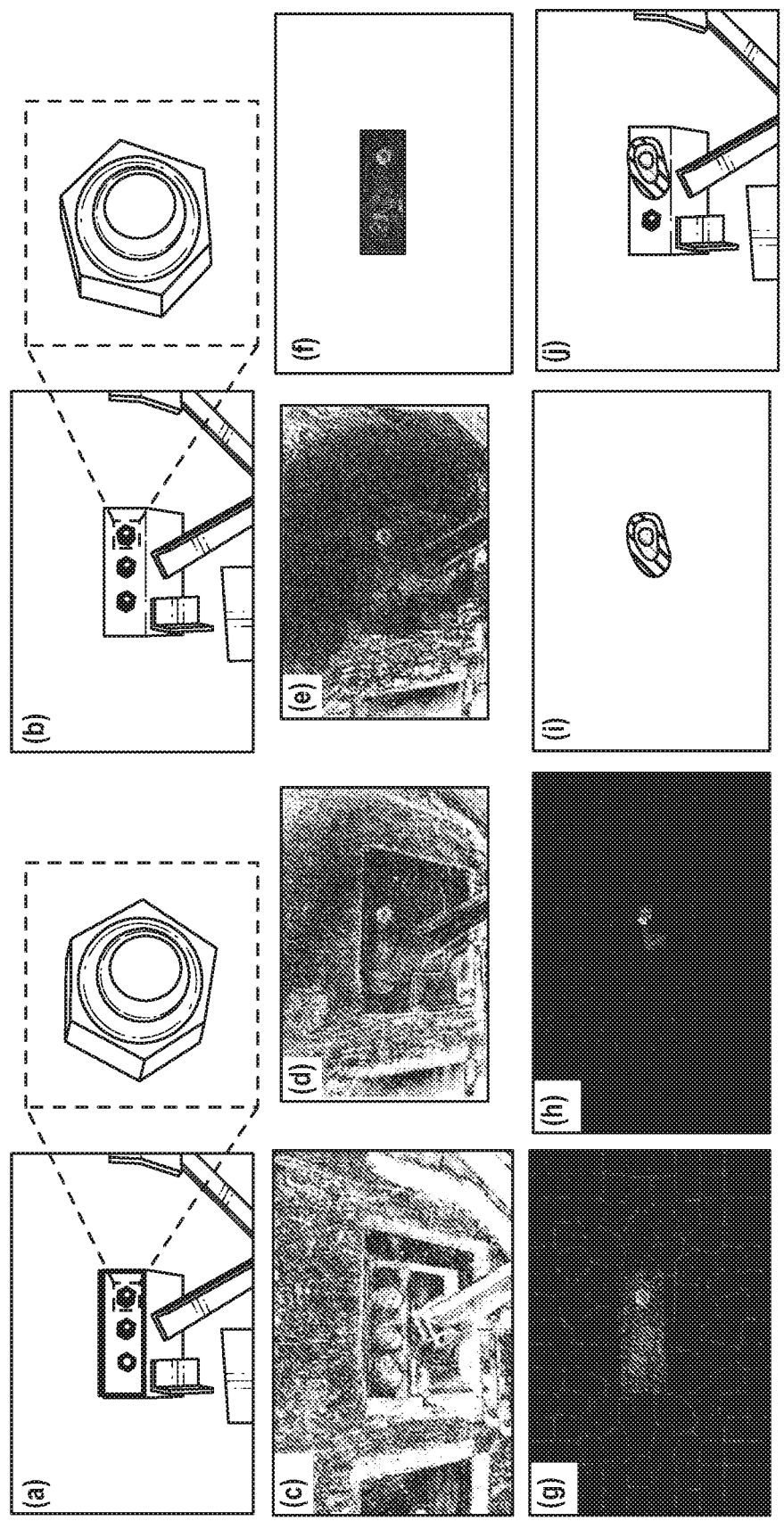
FIG. 16 illustrates results of an example experimental validation test setup according to aspects of the embodiments described herein.

FIG. 16 illustrates results of an example experimental validation test setup according to aspects of the embodiments described herein. Nut loosening is another common phenomenon caused by self-loosening of the bolt. Utilizing the proposed methodology, nut loosening can also be detected. FIG. 16 illustrates an example through the setup of Test 1 (FIG. 7). Instead of bolt heads, nuts were installed at the facial side of the gusset plate, as shown in Image 1 (FIG. 16a). The third nut from the left experienced a counterclockwise rotation (about 15 degree) during inspection interval, and then Image 2 was collected (FIG. 16b). The result indicates that the approach is able to identify the loosened nut (FIG. 16j).

Bolt Type

Figure 17:
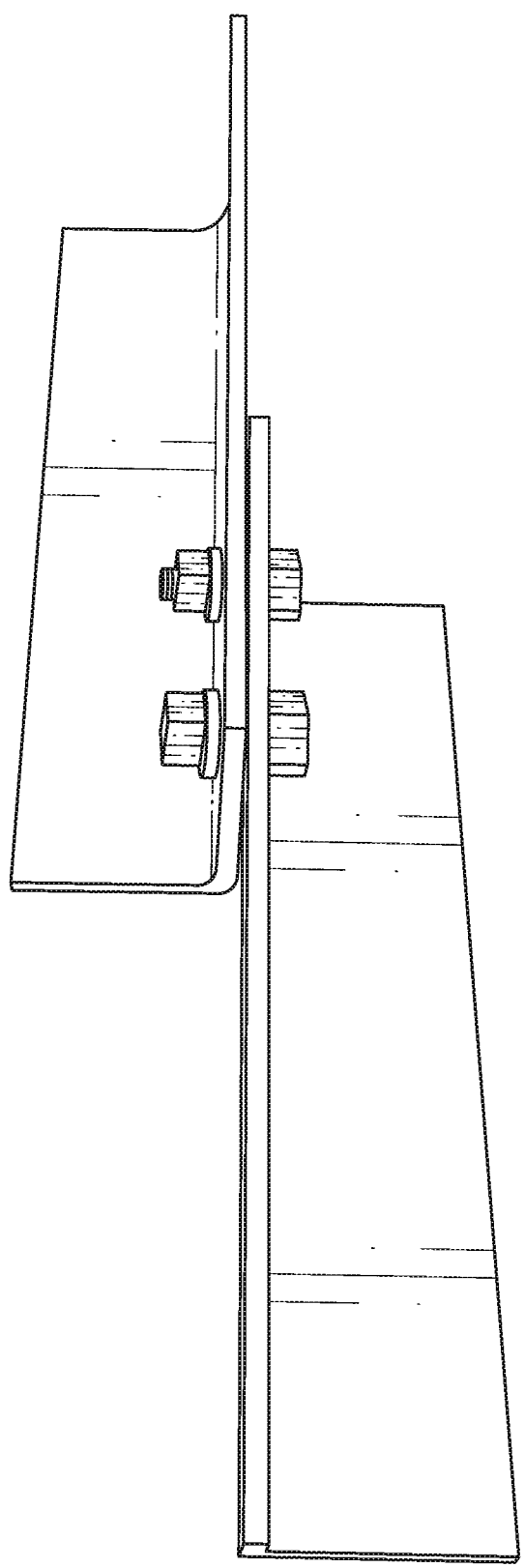
FIG. 17 illustrates a test specimen according to aspects of the embodiments described herein.
Figure 18:
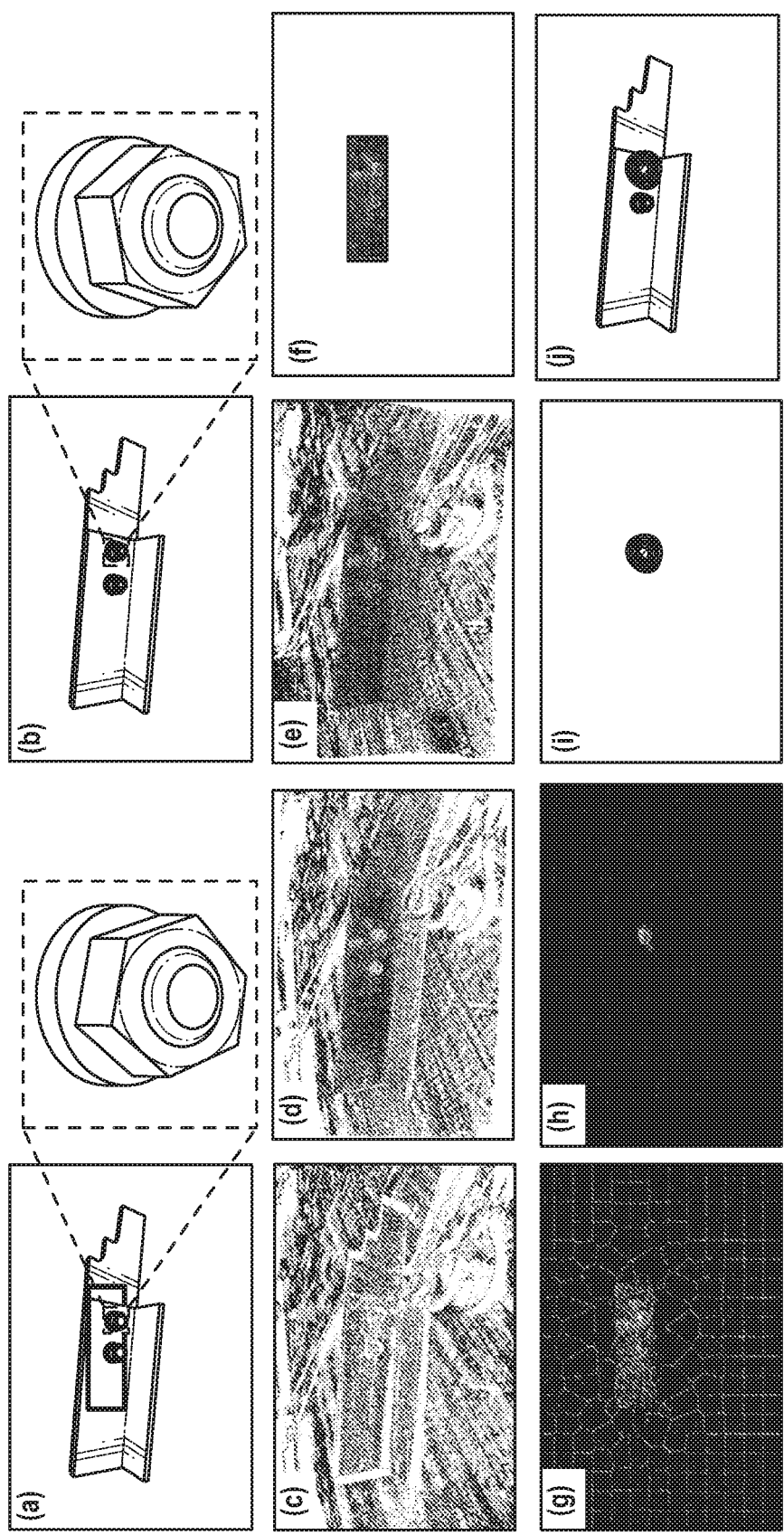
FIG. 18 illustrates results of an example experimental validation according to aspects of the embodiments described herein applied to the test specimen of FIG. 17.

FIG. 17 illustrates a test specimen according to aspects of the embodiments described herein. FIG. 18 illustrates results of an example experimental validation according to aspects of the embodiments described herein applied to the test specimen of FIG. 17.

Application of the present approach for a different bolt type is demonstrated in FIG. 18a. A double angle steel joint with two bolts was adopted in this experiment. The dimensions of the double angles were 2L76.2 mm×50.8 mm×4.8 mm (2L3 in.×2 in.×3/16 in.). The diameter of each bolt was 7.9 mm (5/16 in.), which is much smaller than the bolt (19.05 mm) applied in Section 3. The second nut from the left was rotated about 30 degrees in the counterclockwise direction, as shown in Image 2 (FIG. 18b). Such a rotation leads to registration errors around the loosened nut, which can be detected by the present approach, as shown in FIG. 18j.

Gap Caused by Nut Loosening

Figure 19:
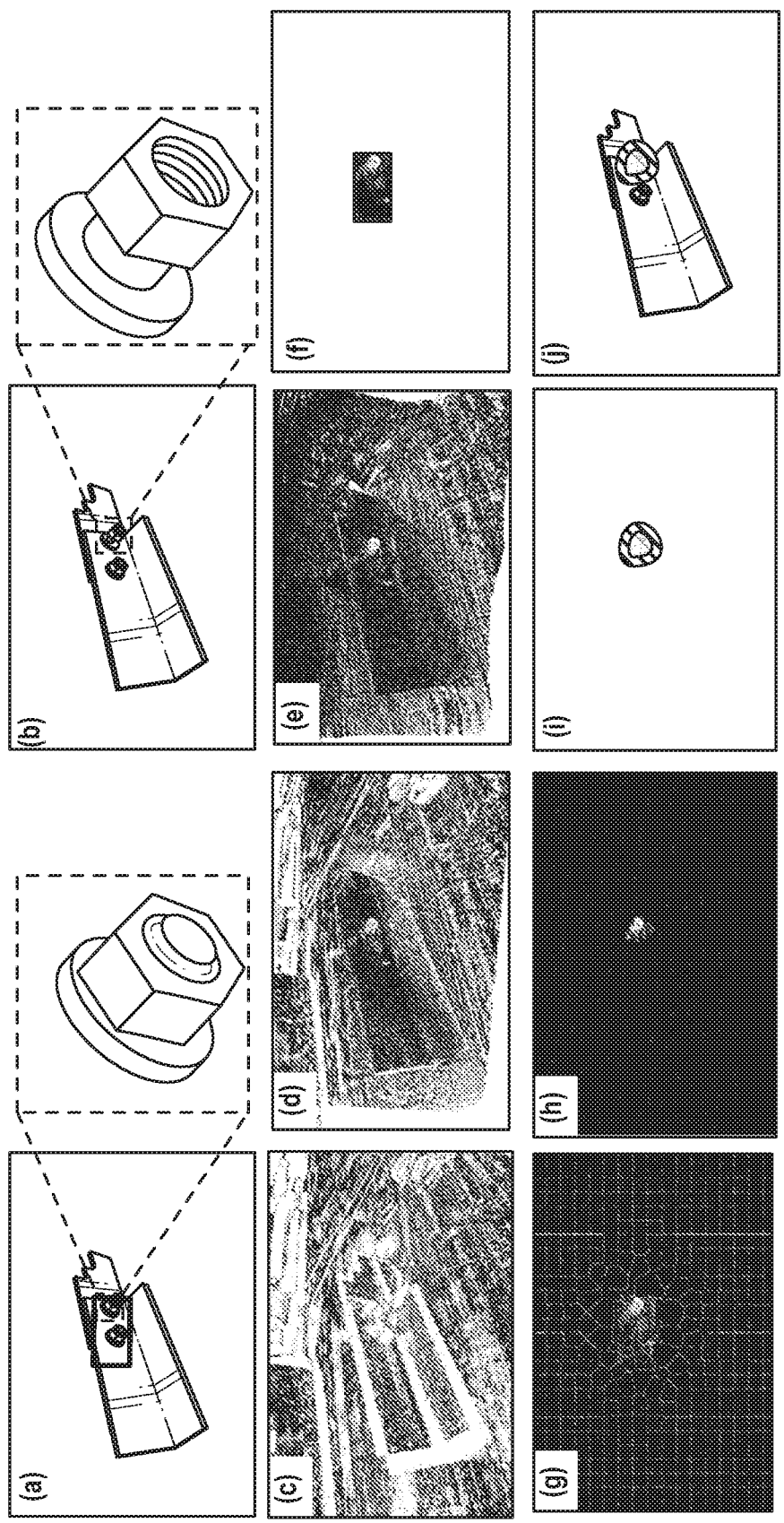
FIG. 19 illustrates results of an example experimental validation test setup according to aspects of the embodiments described herein applied to the test specimen of FIG. 17.

Instead of finding the rotation of bolts' heads and nuts, an alternative strategy for bolt loosening detection is to identify the change of the gap between the nut and the bolted surface. This strategy would be particularly useful for practical implementation if the front views of the bolt heads and/or nuts are difficult to obtain in field conditions (e.g. the space in front of the monitored structure is occupied by other objects). FIG. 19 illustrates results of an example experimental validation test setup according to aspects of the embodiments described herein. As demonstrated in FIG. 19b, the loosened nut results in a gap at the second bolt. The changes of intensities associated with this outward movement of the nut become features of bolt loosening detection (FIG. 19j).

In various embodiments of the present disclosure, the fastener can include a nut, a bolt, a screw, or any other type of fastener that can accurately be identified using the approach presented herein.

In various embodiments, images are captured using a consumer-grade digital camera. In various other embodiments, images may be acquired from a video feed using suitable methods, as will be apparent to one skilled in the art.

The embodiments described herein can be embodied in hardware, software, or a combination of hardware and software. If embodied in software (in part), each procedural step or element can be embodied as a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system.

If embodied in hardware (in part), each element can represent a circuit or a number of interconnected circuits that implement the specified logical function(s). The hardware can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

The hardware can also include at least one processing circuit. Such a processing circuit can include, for example, one or more processors and one or more storage or memory devices coupled to a local interface. The local interface can include, for example, a data bus with an accompanying address/control bus or any other suitable bus structure. The storage or memory devices can store data or components that are executable by the processors of the processing circuit.

Also, one or more or more of the components described herein that include software or program instructions can be embodied in a non-transitory computer-readable medium for use by or in connection with an instruction execution system, such as a processor or processing circuit. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

The above-described examples of the present disclosure are merely possible examples of implementations set forth for a clear understanding of the principles of the disclosure.

Many variations and modifications can be made without departing substantially from the spirit and principles of the disclosure. All such modifications and variations are intended to be included herein within the scope of this disclosure and protected by the following claims.

Clause 1. A method, comprising capturing a first image of a fastener at a first time; capturing a second image of the fastener at a second time; performing a feature-based image registration to create a third image; performing an intensity-based image registration to create a fourth image; determining registration errors based at least in part on a comparison of the first image and the fourth image; and performing a feature enhancement process on the registration errors to determine whether the fastener has loosened between the first time and the second time.

Clause 2. The method of clause 1, wherein the performing the feature-based image registration comprises using a feature-based image registration algorithm.

Clause 3. The method of clause 1 or 2, further comprising defining a region of interest in the first image.

Clause 4. The method of any of clauses 1-3, wherein performing the feature enhancement process on the registration errors comprises creating a fifth image that identifies whether the fastener has loosened at the second time.

Clause 5. The method of any of clauses 1-4, further comprising aligning the second image based at least in part on a coordinate system of the first image.

Clause 6. The method of any of clauses 1-5, further comprising reducing differences between the first image and the third image by registering the third image to the fourth image.

Clause 7. The method of any of clauses 1-6, wherein performing the feature enhancement process comprises: segmenting the registration errors into a plurality of regions; analyzing each of the plurality of regions to determine a coefficient of variation for each of the plurality of regions, the coefficient of variation for each of the plurality of regions being based at least in part on a variation of intensity; and removing any region among the plurality of regions that has a coefficient of variation below a threshold value.

Clause 8. The method of any of clauses 1-7, further comprising visually identifying that the fastener has loosened based at least in part on any region among the plurality of regions that has a coefficient of variation above the threshold value.

Clause 9. The method of any of clauses 1-8, wherein performing the feature-based image registration comprises comparing the first image and the second image, and performing the intensity-based image registration comprises comparing the first image and one of the second image or the third image.

Clause 10. A system for fastener loosening detection, comprising: a capture device; at least one computing device configured to at least: obtain a first image of a fastener at a first time based at least in part on the capture device; obtain a second image of the fastener at a second time based at least in part on the capture device; perform a feature-based image registration to create a third image; perform an intensity-based image registration to create a fourth image; determine registration errors between the first image and the fourth image; and perform a feature enhancement process on the registration errors to determine whether the fastener has loosened between the first time and the second time.

Clause 11. The system of clause 10, wherein the at least one computing device is further configured to at least define a region of interest in the first image.

Clause 12. The system of clause 10 or 11, wherein the at least one computing device is further configured to at least perform the feature enhancement process by creating a fifth image that identifies whether the fastener has loosened at the second time.

Clause 13. The system of any of clauses 10-12, wherein the at least one computing device is further configured to at least align the second image based at least in part on a coordinate system of the first image.

Clause 14. The system of any of clauses 10-13, wherein the at least one computing device is further configured to at least reduce differences between the first image and one of the third image by registering the third image to the fourth image.

Clause 15. The system of any of clauses 10-14, wherein the at least one computing device is configured to perform the feature enhancement process by: segmenting the registration errors into a plurality of regions; analyzing each of the plurality of regions to determine a coefficient of variation for each of the plurality of regions, the coefficient of variation for each of the plurality of regions being based on a variation of intensity; and removing any region among the plurality of regions that has a coefficient of variation below a threshold value.

Clause 16. The system of clause 15, wherein the at least one computing device is further configured to at least identify that the fastener has loosened based on any region among the plurality of regions that has a coefficient of variation above the threshold value.

Clause 17. A non-transitory computer-readable medium embodying a program that, when executed by at least one computing device, causes the at least one computing device to at least: capture a first image of a fastener at a first time; capture a second image of the fastener at a second time; perform a feature-based image registration to create a third image; perform an intensity-based image registration to create a fourth image; determine registration errors between the first image and the fourth image; and determine whether the fastener has loosened between the first time and the second time based at least in part on a feature enhancement process algorithm and the registration errors.

Clause 18. The non-transitory computer-readable medium of clause 17, wherein the program further causes the at least one computing device to at least define a region of interest in the first image.

Clause 19. The non-transitory computer-readable medium of clause 17 or 18, wherein the program further causes the at least one computing device to at least align the second image based at least in part on a coordinate system of the first image.

Clause 20. The non-transitory computer-readable medium of any of clauses 17-19, wherein the program further causes the at least one computing device to at least reduce differences between the first image and one of the third image by registering the third image to the fourth image.

Therefore, the following is claimed:

1. A method, comprising:
capturing a first image of a fastener at a first time;
capturing a second image of the fastener at a second time;
performing a feature-based image registration to create a third image;
performing an intensity-based image registration to create a fourth image;
determining registration errors based at least in part on a comparison of the first image and the fourth image; and performing a feature enhancement process on the registration errors to determine whether the fastener has loosened between the first time and the second time.

2. The method of claim 1, wherein the performing the feature-based image registration comprises using a feature-based image registration algorithm.

3. The method of claim 1, further comprising defining a region of interest in the first image.

4. The method of claim 1, wherein performing the feature enhancement process on the registration errors comprises creating a fifth image that identifies whether the fastener has loosened at the second time.

5. The method of claim 1, further comprising aligning the second image based at least in part on a coordinate system of the first image.

6. The method of claim 1, further comprising reducing differences between the first image and the third image by registering the third image to the fourth image.

7. The method of claim 1, wherein performing the feature enhancement process comprises:
   segmenting the registration errors into a plurality of regions;
   analyzing each of the plurality of regions to determine a coefficient of variation for each of the plurality of regions, the coefficient of variation for each of the plurality of regions being based at least in part on a variation of intensity; and
   removing any region among the plurality of regions that has a coefficient of variation below a threshold value.

8. The method of claim 7, further comprising visually identifying that the fastener has loosened based at least in part on any region among the plurality of regions that has a coefficient of variation above the threshold value.

9. The method of claim 1, wherein performing the feature-based image registration comprises comparing the first image and the second image and performing the intensity-based image registration comprises comparing the first image and one of the second image or the third image.

10. A system for fastener loosening detection, comprising:
    a capture device;
    at least one computing device configured to at least:
      obtain a first image of a fastener at a first time based at least in part on the capture device;
      obtain a second image of the fastener at a second time based at least in part on the capture device;
      perform a feature-based image registration to create a third image;
      perform an intensity-based image registration to create a fourth image;
      determine registration errors between the first image and the fourth image; and
      perform a feature enhancement process on the registration errors to determine whether the fastener has loosened between the first time and the second time.

11. The system of claim 10, wherein the at least one computing device is further configured to at least define a region of interest in the first image.

12. The system of claim 10, wherein the at least one computing device is further configured to at least perform the feature enhancement process by creating a fifth image that identifies whether the fastener has loosened at the second time.

13. The system of claim 10, wherein the at least one computing device is further configured to at least align the second image based at least in part on a coordinate system of the first image.

14. The system of claim 10, wherein the at least one computing device is further configured to at least reduce differences between the first image and one of the third image by registering the third image to the fourth image.

15. The system of claim 10, wherein the at least one computing device is configured to perform the feature enhancement process by:
   segmenting the registration errors into a plurality of regions;
   analyzing each of the plurality of regions to determine a coefficient of variation for each of the plurality of regions, the coefficient of variation for each of the plurality of regions being based on a variation of intensity; and
   removing any region among the plurality of regions that has a coefficient of variation below a threshold value.

16. The system of claim 15, wherein the at least one computing device is further configured to at least identify that the fastener has loosened based on any region among the plurality of regions that has a coefficient of variation above the threshold value.

17. A non-transitory computer-readable medium embodying a program that, when executed by at least one computing device, causes the at least one computing device to at least:
   capture a first image of a fastener at a first time;
   capture a second image of the fastener at a second time;
   perform a feature-based image registration to create a third image;
   perform an intensity-based image registration to create a fourth image;
   determine registration errors between the first image and the fourth image; and
   determine whether the fastener has loosened between the first time and the second time based at least in part on a feature enhancement process algorithm and the registration errors.

18. The non-transitory computer-readable medium of claim 17, wherein the program further causes the at least one computing device to at least define a region of interest in the first image.

19. The non-transitory computer-readable medium of claim 17, wherein the program further causes the at least one computing device to at least align the second image based at least in part on a coordinate system of the first image.

20. The non-transitory computer-readable medium of claim 17, wherein the program further causes the at least one computing device to at least reduce differences between the first image and one of the third image by registering the third image to the fourth image.

* * * * *